(12) United States Patent
Nash et al.

(10) Patent No.: US 7,510,199 B2
(45) Date of Patent: Mar. 31, 2009

(54) OFF-ROAD VEHICLE WITH WHEEL SUSPENSION

(75) Inventors: Colby Nash, Newnan, GA (US); Eiji Kato, Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 181 days.

(21) Appl. No.: 10/796,692

(22) Filed: Mar. 9, 2004

(65) Prior Publication Data

US 2004/0195797 A1 Oct. 7, 2004

Related U.S. Application Data

(60) Provisional application No. 60/459,957, filed on Apr. 2, 2003, provisional application No. 60/459,959, filed on Apr. 2, 2003.

(51) Int. Cl.
*B60G 3/20* (2006.01)
(52) U.S. Cl. .................. 280/124.135; 280/781; 180/311
(58) Field of Classification Search .......... 280/124.134, 280/124.135, 124.136, 788, 781; 180/311, 180/312, 908
See application file for complete search history.

(56) References Cited

U.S. PATENT DOCUMENTS

| 483,644 A | 10/1892 | Cunningham |
|---|---|---|
| 957,626 A | 5/1910 | Rivers |
| 1,852,464 A | 4/1932 | Leipert |
| 2,053,869 A | 9/1936 | Hatenberger |
| 2,064,100 A | 12/1936 | Bachman |
| 2,145,545 A | 1/1939 | Johnson et al. |
| 2,315,317 A | 3/1943 | Copp et al. |
| 2,331,976 A | 10/1943 | Hare |
| 2,707,402 A | 5/1955 | Blair |
| 2,718,409 A * | 9/1955 | Kishline et al. ............. 280/788 |
| 2,751,992 A * | 6/1956 | Nallinger ..................... 180/56 |
| 2,792,498 A * | 5/1957 | Pewitt ........................ 331/159 |
| 2,850,852 A | 9/1958 | Hofberger |
| 3,147,814 A | 9/1964 | Suhre |
| 3,149,856 A | 9/1964 | Schilberg |
| 3,229,424 A | 1/1966 | Fairchok |
| 3,419,098 A | 12/1968 | Mayers et al. |

(Continued)

FOREIGN PATENT DOCUMENTS

AT 171825 12/1951

(Continued)

OTHER PUBLICATIONS

ATV 1998 Yamaha Catalogue, Information about Breeze, 8 pages.

(Continued)

*Primary Examiner*—Ruth Ilan
*Assistant Examiner*—Drew J. Brown
(74) *Attorney, Agent, or Firm*—Knobbe Martens Olson & Bear LLP

(57) ABSTRACT

An off-road vehicle has a frame and at least one wheel. A suspension arm suspends the wheel from the frame. The frame includes at least one horizontal member that extends generally horizontally fore to aft. A set of retainers are attached to the horizontal member. The retainers are spaced apart from each other fore to aft. The retainers swingably retain the suspension arm therebetween.

46 Claims, 13 Drawing Sheets

U.S. PATENT DOCUMENTS

| | | | |
|---|---|---|---|
| 3,650,344 A | 3/1972 | Plessinger et al. | |
| 3,709,314 A | 1/1973 | Hickey | |
| 3,733,918 A | 5/1973 | Domaas | |
| 3,943,785 A | 3/1976 | Percifield | |
| 4,249,631 A | 2/1981 | Huneke | |
| 4,350,124 A | 9/1982 | Kitano et al. | |
| 4,354,570 A | 10/1982 | Tanaka et al. | |
| 4,496,019 A | 1/1985 | Tanaka | |
| 4,497,285 A | 2/1985 | Kondo | |
| 4,531,928 A | 7/1985 | Ikenoya | |
| 4,534,442 A | 8/1985 | Botar | |
| 4,597,466 A | 7/1986 | Yamada | |
| 4,600,074 A | 7/1986 | Watanabe et al. | |
| 4,632,071 A | 12/1986 | Arai et al. | |
| 4,650,029 A | 3/1987 | Foote et al. | |
| 4,671,373 A | 6/1987 | Sigl | |
| 4,681,185 A | 7/1987 | Hoernig | |
| 4,697,665 A | 10/1987 | Eastman et al. | |
| 4,733,639 A | 3/1988 | Kohyama et al. | |
| 4,735,275 A * | 4/1988 | Tsukahara et al. | 180/215 |
| 4,744,432 A | 5/1988 | Shibata et al. | |
| 4,751,856 A | 6/1988 | Nakamura | |
| 4,765,434 A | 8/1988 | Kawamoto et al. | |
| 4,773,661 A | 9/1988 | Kosuge | |
| 4,773,675 A | 9/1988 | Kosuge | |
| 4,792,012 A | 12/1988 | Morisawa | |
| 4,798,400 A | 1/1989 | Kosuge | |
| 4,815,550 A | 3/1989 | Mather et al. | |
| 4,817,985 A | 4/1989 | Enokimoto et al. | |
| 4,821,685 A | 4/1989 | Matsushima et al. | |
| 4,881,610 A | 11/1989 | Kosuge | |
| 4,883,138 A | 11/1989 | Kameda | |
| 4,895,217 A | 1/1990 | Hueckler et al. | |
| 4,951,964 A * | 8/1990 | Sakamoto et al. | 280/788 |
| 4,955,853 A | 9/1990 | Bausch | |
| 5,005,663 A | 4/1991 | Niide | |
| 5,044,646 A | 9/1991 | Liga et al. | |
| 5,054,573 A | 10/1991 | Bennett | |
| 5,054,842 A | 10/1991 | Ishiwatari et al. | |
| 5,071,392 A | 12/1991 | Stall | |
| 5,086,858 A | 2/1992 | Mizuta | |
| 5,101,924 A | 4/1992 | Yamagiwa et al. | |
| 5,107,952 A * | 4/1992 | Matsubayashi et al. | 180/349 |
| 5,125,490 A | 6/1992 | Suzumura | |
| 5,152,365 A | 10/1992 | Aoshima | |
| 5,169,171 A * | 12/1992 | Ban et al. | 280/86.753 |
| 5,195,607 A | 3/1993 | Shimada et al. | |
| 5,251,713 A | 10/1993 | Enokimoto | |
| 5,257,672 A | 11/1993 | Ohtagaki | |
| 5,314,378 A | 5/1994 | Ohtagaki | |
| 5,327,989 A | 7/1994 | Furuhasi et al. | |
| 5,366,041 A | 11/1994 | Shiraishi | |
| 5,401,056 A | 3/1995 | Eastman | |
| 5,431,429 A * | 7/1995 | Lee | 280/124.139 |
| 5,451,188 A | 9/1995 | Kraft | |
| 5,498,019 A * | 3/1996 | Adato | 280/124.136 |
| 5,505,267 A | 4/1996 | Orbach | |
| 5,575,352 A | 11/1996 | Suzuki et al. | |
| 5,577,747 A | 11/1996 | Ogawa et al. | |
| 5,775,455 A | 7/1998 | Cho | |
| 5,873,428 A | 2/1999 | Ohshita et al. | |
| 5,902,489 A | 5/1999 | Yasuda | |
| 5,915,727 A * | 6/1999 | Bonnville | 280/788 |
| 5,950,478 A | 9/1999 | Sato et al. | |
| 5,950,748 A | 9/1999 | Matsumoto et al. | |
| 5,980,415 A | 11/1999 | Showalter | |
| 6,016,883 A | 1/2000 | Yamada | |
| 6,038,506 A | 3/2000 | Diekhans | |
| 6,047,988 A * | 4/2000 | Aloe et al. | 280/788 |
| 6,076,624 A | 6/2000 | Izumi et al. | |
| 6,085,138 A | 7/2000 | Smith | |
| 6,105,702 A | 8/2000 | Showalter | |
| 6,108,601 A | 8/2000 | Breithor | |
| 6,155,371 A | 12/2000 | Izumi | |
| 6,170,875 B1 * | 1/2001 | Jones et al. | 280/788 |
| 6,202,777 B1 | 3/2001 | Surridge | |
| 6,269,899 B1 | 8/2001 | Izumi | |
| 6,273,074 B1 | 8/2001 | Kawamata | |
| 6,386,310 B2 | 5/2002 | Honzek | |
| 6,405,823 B1 | 6/2002 | Fukamachi et al. | |
| 6,454,040 B1 | 9/2002 | Fukuda | |
| 6,502,659 B2 | 1/2003 | Akasaka | |
| 6,510,912 B1 | 1/2003 | Atsuumi | |
| 6,523,634 B1 | 2/2003 | Gagnon et al. | |
| 6,533,060 B1 | 3/2003 | Seto | |
| 6,547,023 B2 | 4/2003 | Laimbock | |
| 6,557,661 B1 | 5/2003 | Hurlburt | |
| 6,582,004 B1 | 6/2003 | Hamm | |
| 6,595,312 B2 | 7/2003 | Yoshioka | |
| 6,622,806 B1 | 9/2003 | Matsuura | |
| 6,626,260 B2 | 9/2003 | Gagnon et al. | |
| 6,648,093 B2 | 11/2003 | Rioux et al. | |
| 6,675,925 B2 | 1/2004 | Takahashi et al. | |
| 6,691,815 B2 | 2/2004 | Rioux et al. | |
| 6,695,083 B2 | 2/2004 | Nakamura et al. | |
| 6,695,086 B2 | 2/2004 | Kawamoto | |
| 6,702,058 B2 * | 3/2004 | Ishii et al. | 180/311 |
| 6,729,830 B2 | 5/2004 | Wagner et al. | |
| 6,732,830 B2 | 5/2004 | Gagnon | |
| 6,767,022 B1 * | 7/2004 | Chevalier | 280/124.136 |
| 6,874,590 B2 | 4/2005 | Rondeau et al. | |
| 6,896,087 B2 | 5/2005 | Korenjak et al. | |
| 6,902,022 B2 | 6/2005 | Mathukia | |
| 6,920,949 B2 | 7/2005 | Matsuura et al. | |
| 7,147,075 B2 | 12/2006 | Tanaka et al. | |
| 2001/0013440 A1 | 8/2001 | Izumi et al. | |
| 2001/0045312 A1 | 11/2001 | Adachi et al. | |
| 2002/0000340 A1 | 1/2002 | Laimbock | |
| 2002/0027038 A1 | 3/2002 | Rioux et al. | |
| 2002/0063005 A1 * | 5/2002 | Klais | 180/167 |
| 2002/0070066 A1 | 6/2002 | Nakamura | |
| 2002/0117843 A1 | 8/2002 | Rasidescu et al. | |
| 2002/0125057 A1 | 9/2002 | Kitai et al. | |
| 2002/0139598 A1 | 10/2002 | Miguchi | |
| 2003/0146033 A1 | 8/2003 | Malstrom | |
| 2003/0173132 A1 | 9/2003 | Komatsu | |
| 2004/0124029 A1 | 7/2004 | Takenaka et al. | |
| 2004/0195034 A1 | 10/2004 | Kato et al. | |
| 2004/0206567 A1 | 10/2004 | Kato et al. | |
| 2004/0216942 A1 | 11/2004 | Takenaka et al. | |
| 2005/0103553 A1 | 5/2005 | Korenjak et al. | |
| 2005/0109554 A1 | 5/2005 | Ishikawa et al. | |
| 2005/0126842 A1 | 6/2005 | Rasidescu et al. | |
| 2005/0150706 A1 | 7/2005 | Eguchi et al. | |
| 2005/0230209 A1 | 10/2005 | Duignan | |

FOREIGN PATENT DOCUMENTS

| | | |
|---|---|---|
| GB | 164 051 | 7/1920 |
| JP | 3119213 | 12/1956 |
| JP | 5758332 | 12/1982 |
| JP | 5815230 | 3/1983 |
| JP | 5844255 | 3/1983 |
| JP | 5939920 | 3/1984 |
| JP | 5977924 | 5/1984 |
| JP | 6113093 | 4/1986 |
| JP | 61-89187 | 5/1986 |
| JP | 0557955 | 8/1993 |
| JP | 6-34213 | 9/1994 |
| JP | 10035314 | 2/1998 |
| JP | 10035315 | 2/1998 |

| | | |
|---|---|---|
| JP | 2000-103246 | 4/2000 |

OTHER PUBLICATIONS

ATV 1998 Yamaha Catalogue, Information about Grizzly 4WD; 8 pages.

For sale ad of a Meyers Manx dune buggy including multiple photos, http://www.oldbug.com/manx.htm, published on or before Jul. 25, 2007—with the vehicle shown being in public use in 1968 or before.

* cited by examiner

OFF-ROAD VEHICLE WITH WHEEL SUSPENSION

PRIORITY INFORMATION

The present application is based on and claims the benefit pursuant to 35 U.S.C. § 119(e) of U.S. Provisional Applications Nos. 60/459,957 and 60/459,959, both filed on Apr. 2, 2003, the entire contents of which are hereby incorporated by reference.

BACKGROUND OF THE INVENTION

1. Field of the Invention

The present invention generally relates to a suspension system for an off-road vehicle.

2. Description of Related Art

Off-road vehicles are designed to be operated over rugged terrain. These vehicles are often operated off-road over terrain such as, for example, steep inclines and declines, rough roads, and areas covered in mud and water.

Off-road vehicles typically include a frame that is supported by wheels. In one common arrangement, the vehicle has four wheels, i.e., a pair of front wheels and a pair of rear wheels. An internal combustion engine is employed to power at least the rear or front wheels, and most commonly, all of the wheels. Typically, the engine is combined with a transmission to form an engine unit. The transmission transfers power to an output shaft from a crankshaft of the engine. The output shaft drives the wheels. For example, Japanese Patent Utility Model No. JP-Y2-H6-34213 discloses such an arrangement.

The off-road vehicles also include suspension mechanisms that suspend the front and rear wheels in a manner permitting the wheels to move generally vertically relative to the off-road vehicle frame. The frame also typically has brackets that journal axles of the front and rear wheels. Because the frame is formed with tubular members, only limited space is available to fix the brackets to the frame. Moreover, the particular framework to which the brackets are affixed need to ensure sufficient stiffness. As a result, the off-road vehicle's fundamental framework often times needs to be rearranged in order to meet the space and stiffness requirements for prior suspension mechanisms.

SUMMARY OF THE INVENTION

An aspect of the present invention involves an off-road vehicle comprising a frame and at least one wheel. A suspension arm includes a plurality of ends and is configured to suspend the wheel from the frame. The frame includes at least one horizontal member extending generally horizontally fore to aft. A set of retainers is coupled to the horizontal member. The retainers are spaced apart from each other fore to aft. Each retainer is configured to retain one of the ends of the suspension arm in a manner permitting the suspension arm to swing relative to the set of retainers.

In accordance with another aspect of the present invention, an off-road vehicle comprises a frame and at least one wheel. A suspension arm is configured to suspend the wheel from the frame. The frame includes a set of vertical members that extend generally vertically. The vertical members are spaced apart from each other fore to aft. The suspension arm is coupled to the vertical members in a manner permitting the suspension arm to swing relative to the frame.

In accordance with a further aspect of the present invention, an off-road vehicle comprises a frame and at least one wheel. A suspension arm is configured to suspend the wheel from the frame. The frame includes a horizontal member extending generally horizontally fore to aft. The horizontal member has a vertical surface that extends generally vertically. A bracket unit is placed on the vertical surface of the horizontal member. The bracket unit is configured to retain at least a portion of the suspension arm in a manner permitting the suspension arm to swing relative to the frame.

BRIEF DESCRIPTION OF THE DRAWINGS

The foregoing and other features, aspects and advantages of the present inventions are described in detail below with reference to the drawings of preferred embodiments which are intended to illustrate and not to limit the inventions. The drawings comprise 13 figures in which.

DETAILED DESCRIPTION OF THE PREFERRED EMBODIMENT

Overall Construction of an Off-Road Vehicle

With reference to FIGS. 1-6, an overall construction of an off-road vehicle 30 is described. Those of skill in the art will appreciate that the present inventions may have utility in a wide range of applications for other vehicles, such as, for example, but without limitation, snow vehicle, tractors, utility vehicles, and the like.

A preferable construction or structure of an off-road vehicle similar to the off-road vehicle 30 is disclosed in, for example, a co-pending U.S. application Ser. No. 10/791,111filed on Mar. 2, 2004, titled "ENGINE ARRANGEMENT FOR OFF-ROAD VEHICLE,"a co-pending U.S. application Ser. No. 10/791,353 filed on Mar. 2, 2004, titled "DRIVE SYSTEM FOR OFF-ROAD VEHICLE" a co-pending U.S. application Ser. No. 10/790,932 filed on Mar. 2, 2004, titled "AIR INTAKE SYSTEM FOR OFF-ROAD VEHICLE," a co-pending U.S. application Ser. No. 10/792, 463 filed on Mar. 2, 2004, titled "FLOOR ARRANGEMENT FOR OFF-ROAD VEHICLE,"a co-pending U.S. application Ser. No. 10/794,132 filed on Mar. 5, 2004, titled "STEERING SYSTEM FOR OFF-ROAD VEHICLE,"a co-pending U.S. application Ser. No. 10/791,164 filed on Mar. 2. 2004, titled "OFF-ROAD VEHICLE WITH AIR INTAKE SYSTEM, "and a co-pending U.S. application Ser. No. 10/796,609 filed on Mar. 9, 2004, titled "FRAME ARRANGEMENT FOR OFF-ROAD VEHICLE,"the entire contents of which are hereby expressly incorporated by reference.

Figure 1:
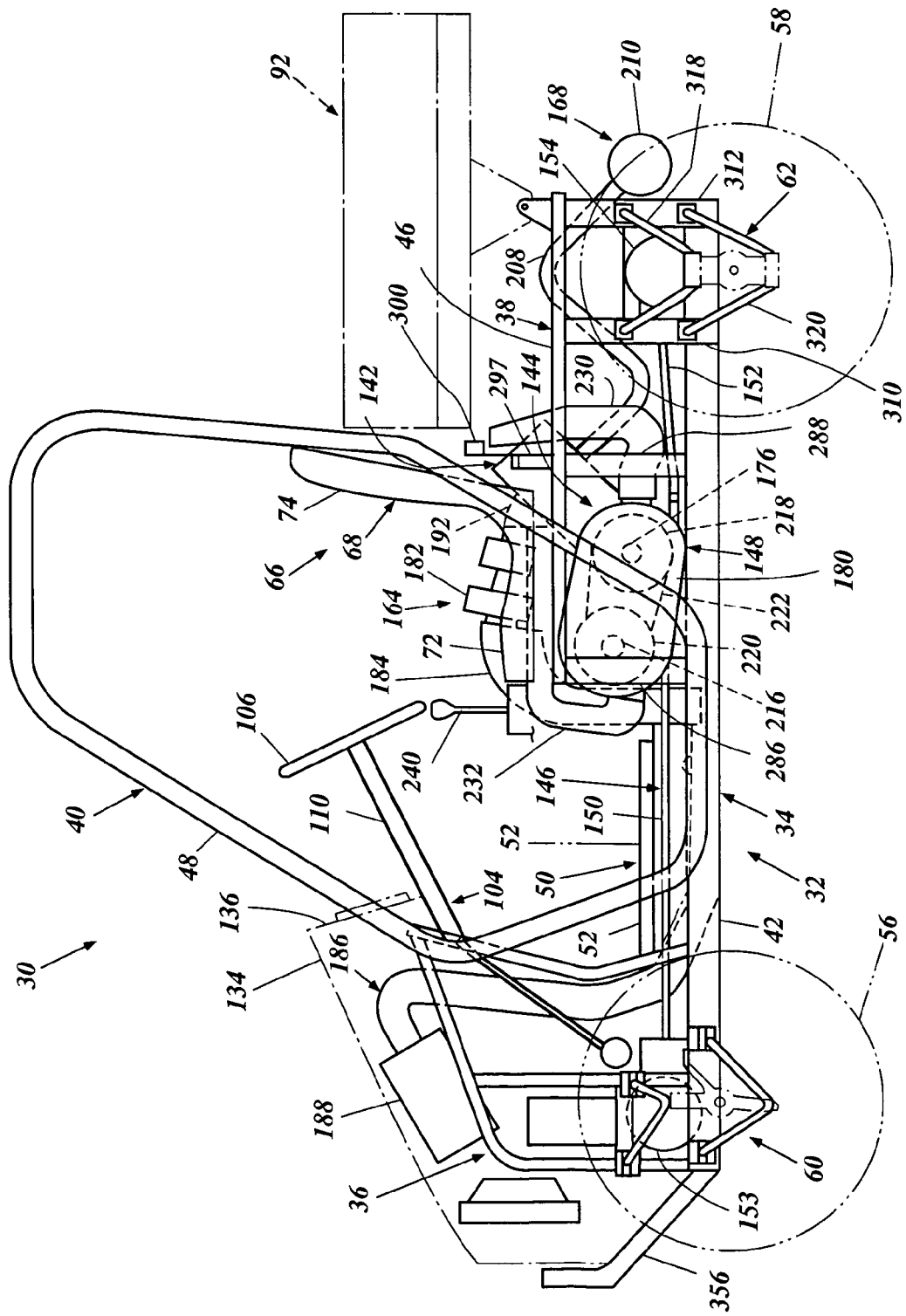
FIG. 1 is a side elevation view of an off-road vehicle configured in accordance with a preferred embodiment.
Figure 2:
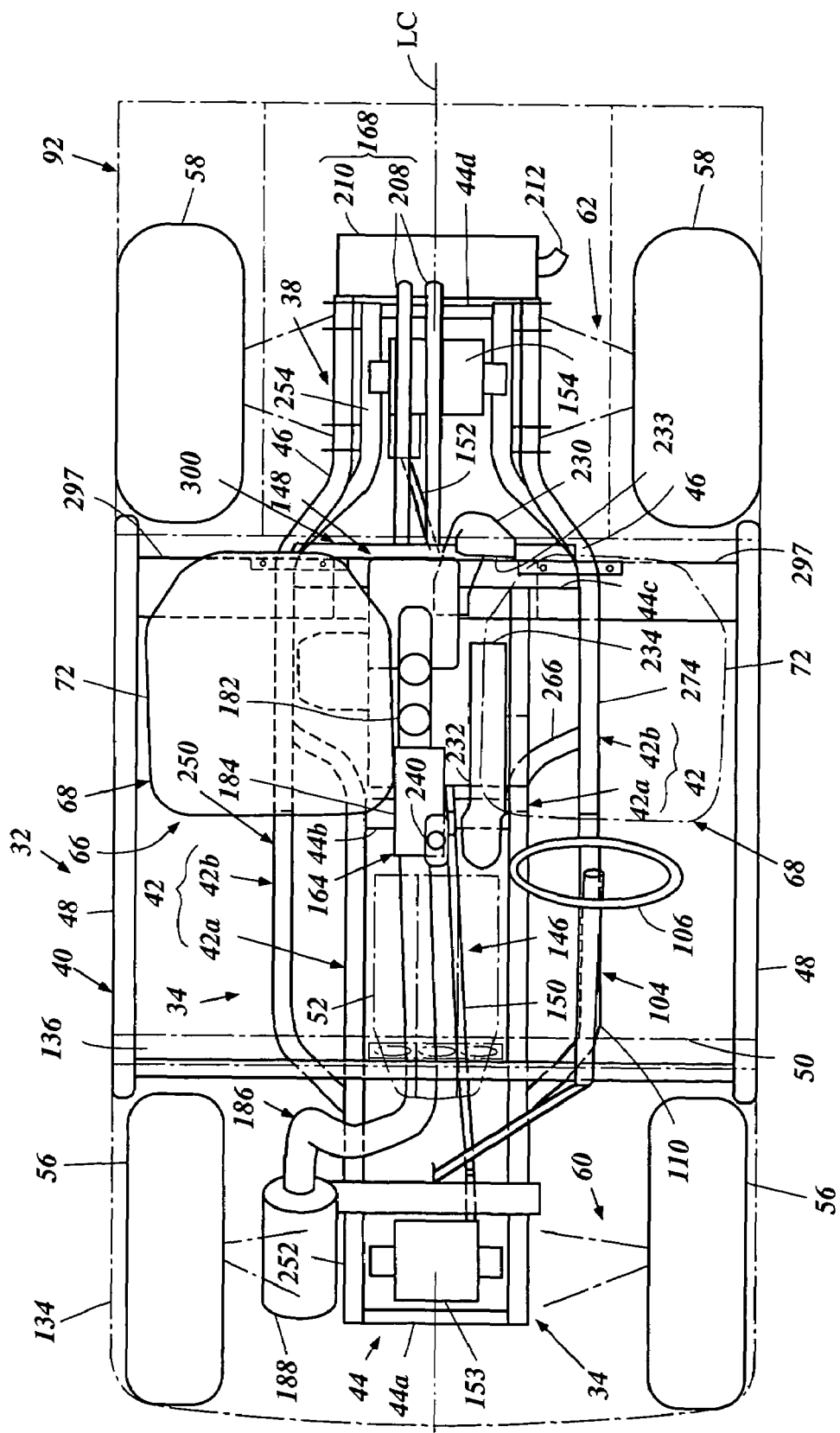
FIG. 2 is a top plan view of the off-road vehicle of FIG. 1.

With reference to FIGS. 1 and 2, the off-road vehicle 30 preferably has an open tubular-type frame or body frame 32. The illustrated frame 32 comprises a main frame 34, a front frame 36, a rear frame 38 and a compartment frame (or pillar frame) 40.

Figure 11:
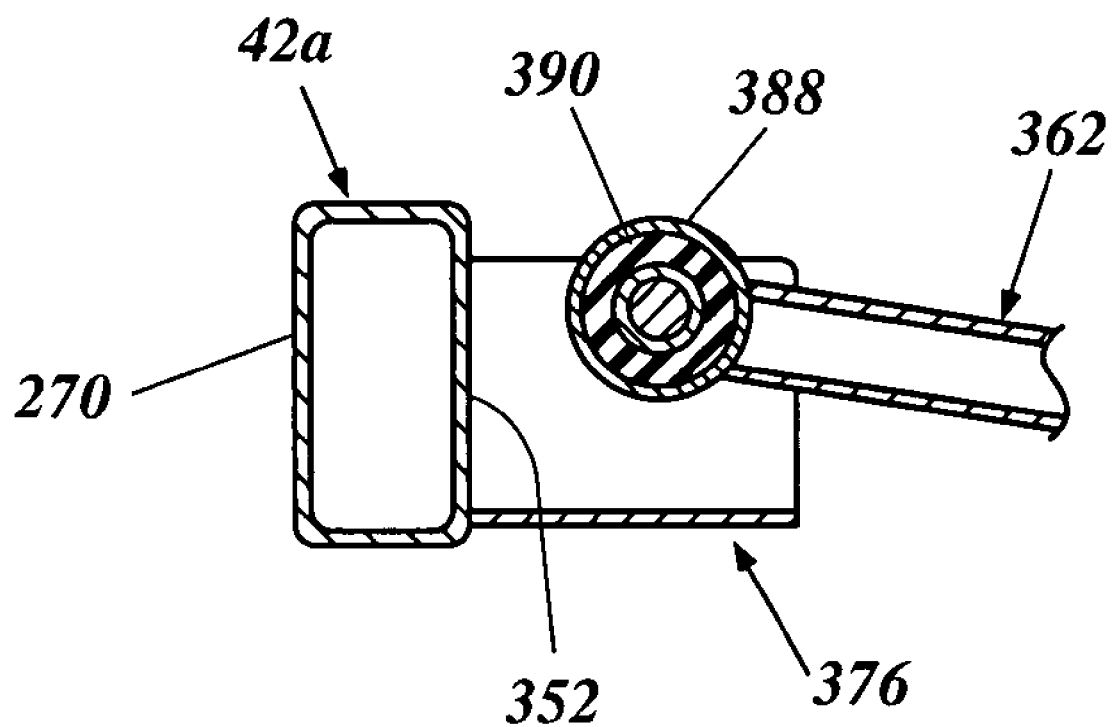
FIG. 11 is a sectional view taken along the line 11-11 of FIG. 10.

The main frame 34 includes a pair of side frame units 42 spaced apart side by side with each other (FIG. 2). Each side frame unit 42 comprises a front member 42a and a rear member 42b. Each member 42a, 42b preferably is rectangular shape in section, but other configurations can be used. In one variation, the front and rear members 42a, 42b can have a circular shape in section. Moreover, the members 42a, 42b can have an incomplete tubular shape such as, for example, a U or C-shape. Each tubular member 42a, 42b though preferably has one or more vertical side surface that is generally flat. One of the vertical side surfaces that is located on the outside of the frame is indicated by the reference numeral 352 in FIG. 11. Each tubular member 42a, 42b preferably extends generally horizontally fore to aft.

A rear end of the front member 42a is bent outwardly and is coupled with a mid portion of the rear member 42b. A forward end of the rear member 42b is bent inwardly and is coupled with a mid portion of the front member 42a. As such, both of the front and rear members 42a, 42b are nested together. The side frame units 42 are coupled with each other by a plurality of cross members 44 that extend transversely between the members 42a, 42b. In the illustrated arrangement, the cross members 44 are first, second, third and fourth cross members 44a, 44b, 44c, 44d (FIG. 2).

The front frame 36 extends generally upward from a front portion of the main frame 34. The rear frame 38 also extends generally upward from a rear portion of the main frame 34. The rear frame 38 preferably includes a pair of rear frame members 46. Several struts connect the rear frame members 46 to the side members 42 of the main frame 34 and support the rear frame members 46 above the side members 42.

The compartment frame 40 is disposed generally between the front and rear frames 36, 38 in a side view as shown in FIG. 1. The compartment frame 40 includes a pair of compartment members 48 extending generally upward and higher than the front and rear frames 36, 38. The compartment members 48 are spaced apart from each other on both sides of the off-road vehicle 30 to be placed more outward than the main frame 34 in the illustrated embodiment.

Figure 5:
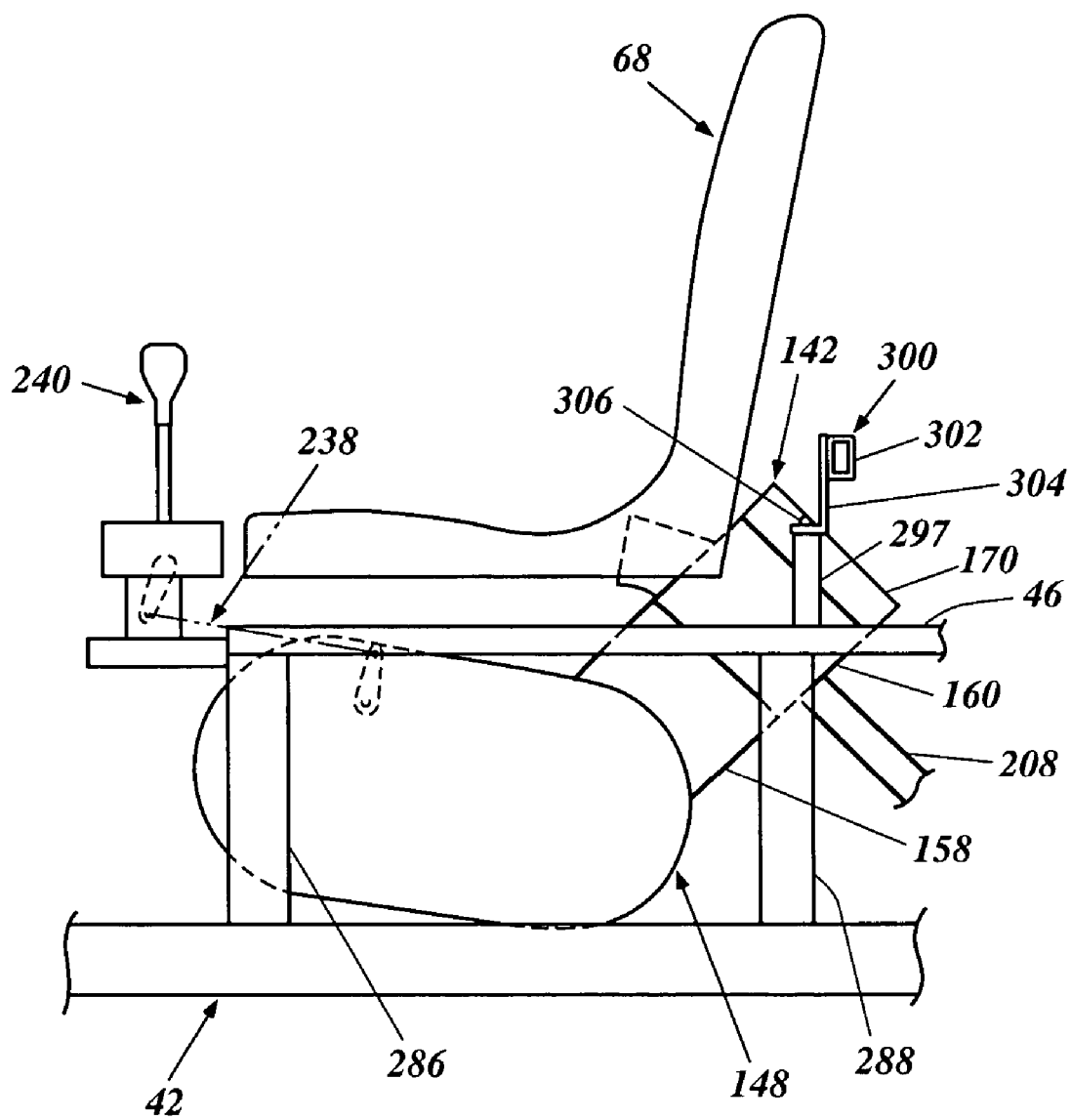
FIG. 5 is a side elevation view of the engine unit illustrating a linkage of a change speed mechanism, wherein frame members extending adjacent to the engine unit also is partially shown.
Figure 6:
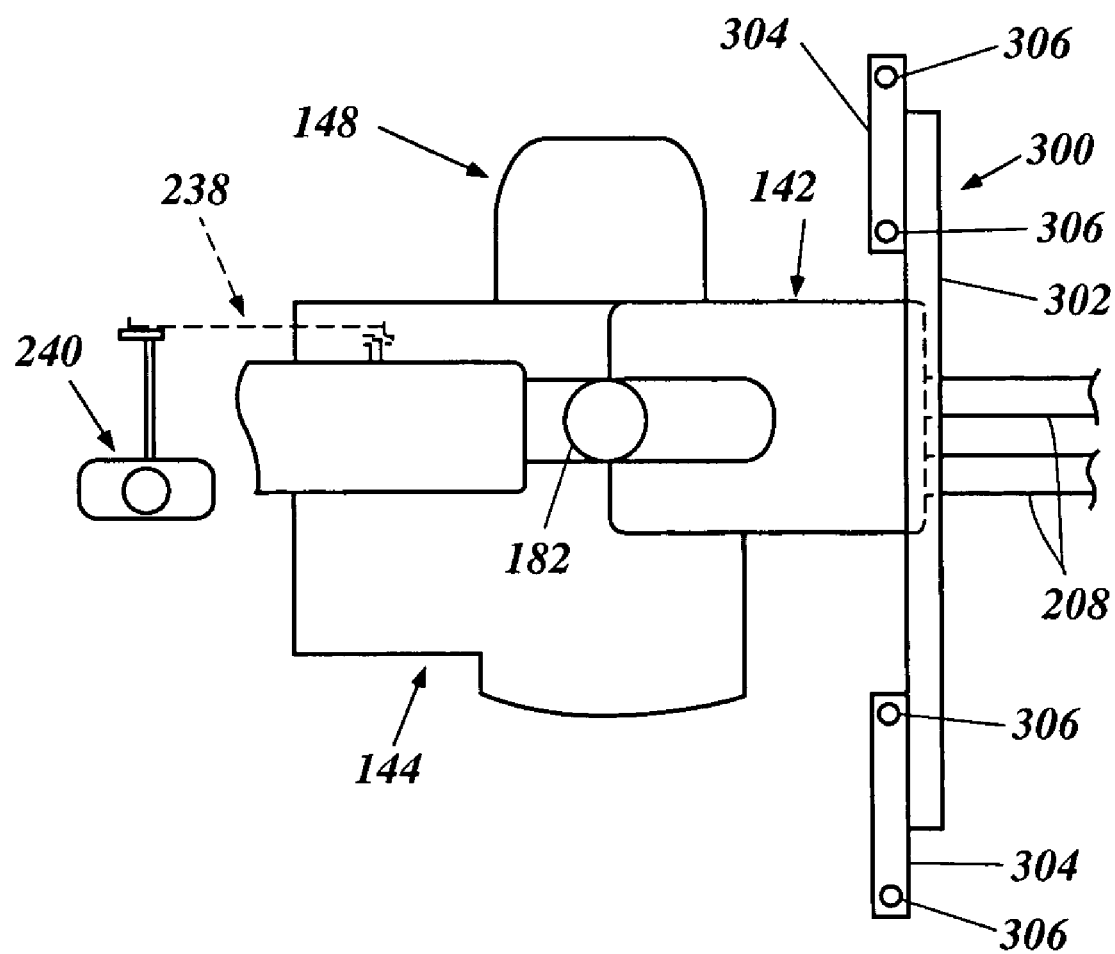
FIG. 6 is a top plan view of the engine unit and the linkage of the change speed mechanism, wherein some of the frame members disposed over the engine unit are also shown.

A floorboard or floor panel 50 extends in an area generally defined by the compartment members 48 in the top plan view (FIG. 2) and is affixed at least to the main frame 34. The floorboard 50 defines a passenger compartment together with the compartment frame 40. As best shown in FIG. 5, the illustrated floorboard 50 generally is a flat panel with a portion that projects upwardly. That is, the floorboard 50 comprises a horizontal section defining a generally flat area and a projection 52 defining a tunnel extending along a longitudinal center plane LC (FIG. 2) of the frame 32 that extends vertically and fore to aft.

The horizontal section can support feet of a driver and a passenger and also can be used as a step when the driver or the passenger enters or leaves the passenger area of the off-road vehicle 30. The illustrated projection 52 is configured as a trapezoid in section and thus has slanted side surfaces and a top surface. Other configurations also can be used The frame 32 is described in greater detail below with reference to FIGS. 7-13.

The main, front, rear and compartment frames 34, 36, 38, 40 preferably are welded to each other. The illustrated structure and arrangement of the frame 32, and the combination of the frame 32 and the floorboard 50 are merely one example. Various structures, arrangements and combinations other than those are practicable. For instance, the respective frames 34, 36, 38, 40 can be provided with struts or reinforcement members which are not described above or will not be described below.

With continued reference to FIGS. 1 and 2, the off-road vehicle 30 preferably has a pair of front wheels 56 and a pair of rear wheels 58 both supporting the frame 32. Each wheel 56, 58 preferably has a balloon tire to advantageously proceed over rough roads and in mud and water. The balloon tire is relatively wide and air pressure of the tire is relatively low. In one arrangement, the selected balloon tires are sized as follows: 25×8-12 at the front end and 25×10-12 at the rear end. The front and rear wheels 56, 58 preferably are coupled with the frame 32 through a front suspension mechanism 60 and a rear suspension mechanism 62, respectively. The front suspension mechanism 60 swingably (up and down) and independently suspends both the front wheels 56. The rear suspension mechanism 62 also swingably (up and down) and independently suspends both the rear wheels 58. Thus, the illustrated off-road vehicle 30 preferably features four wheel independent suspension.

Figure 3:
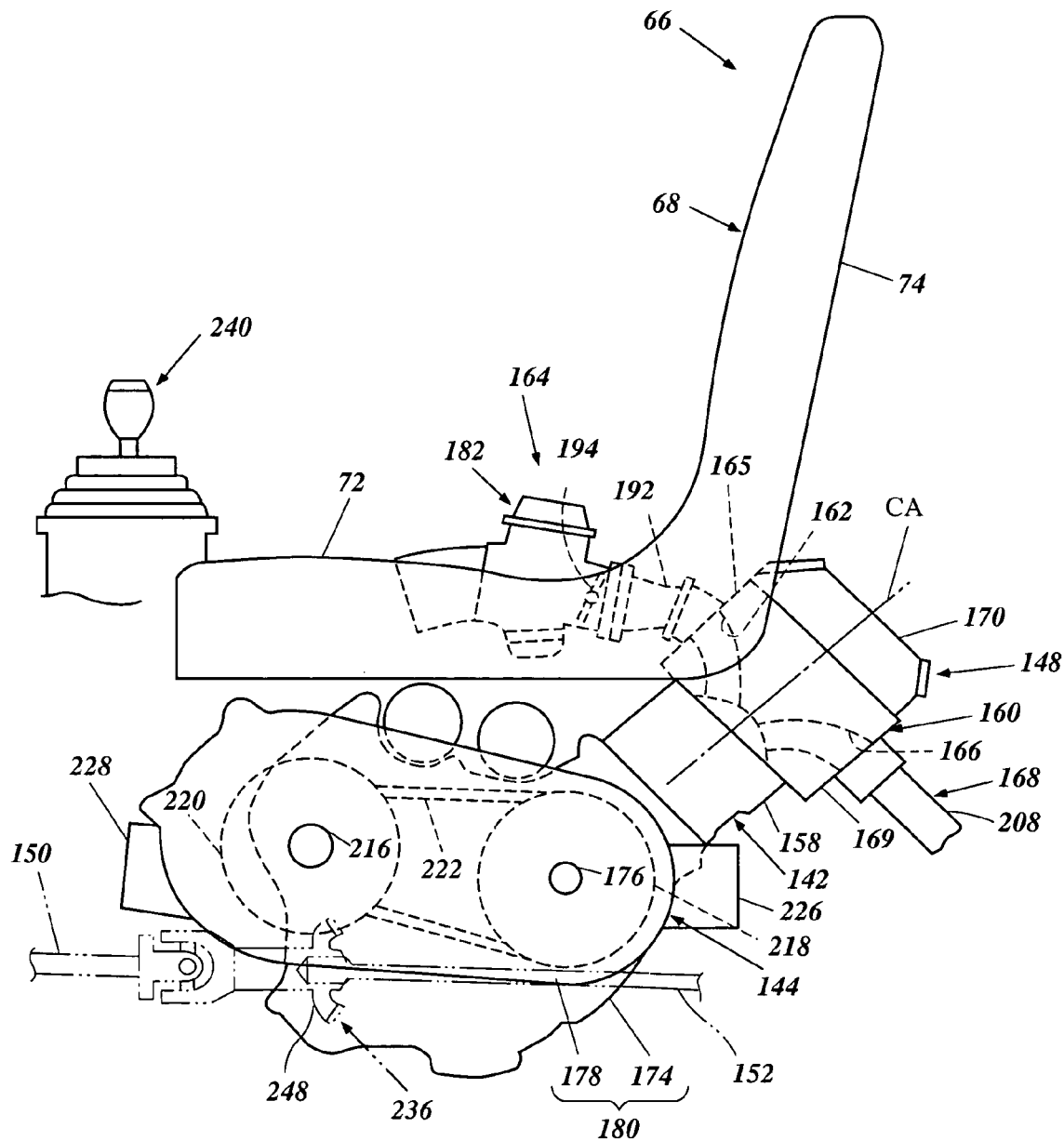
FIG. 3 is a side elevation view of an engine unit of the off-road vehicle.

With reference to FIGS. 1-3, the off-road vehicle 30 preferably has a seat unit 66. The illustrated seat unit 66 comprises a pair of seats 68 such that the driver and the passenger can sit side by side. The seats 68 are spaced apart from one another to form a space therebetween as shown in FIG. 2. Each seat 68 preferably comprises a seat cushion 72 and a seat back 74. The rear frame 38, at least in part, forms a seat pedestal. The seat cushion 72 extends generally horizontally over this seat pedestal and is detachably or removeably affixed to the seat pedestal. The seat back 74 extends generally vertically and upward from a rear portion of the seat cushion 72. In the illustrated arrangement, the seat cushion 72 and the seat back 74 are formed unitarily. In one variation, the seat cushion 72 and the seat back 74 can be separately formed and assembled together.

In this description, the terms "front" and "forward" mean the direction in which the driver or passenger looks straight when seated on the seat 68. Also the terms "rear," "rearward" and "backward" mean the direction opposite to the front direction.

The seat unit 66 can have other number of seats such as, for example, three seats in some alternative arrangements. Also, the seat 68 can be shaped in various configurations. The seat back 74 may be omitted under some circumstances.

With reference to FIGS. 1 and 2, the off-road vehicle 30 preferably has a carrier or cargo box 92 behind the seat unit 66. The illustrated carrier 92 extends over a rear portion of the rear frame 38 and is suitably affixed at least to the rear frame members 46. In one arrangement, the carrier 92 can be tipped rearward to allow its contents to be dumped out. The carrier 92 preferably is formed generally in the shape of a rectangular parallelepiped and has a bottom, a front, a rear and a pair of lateral sides. That is, the carrier 92 is generally configured as an open-topped box.

With continued reference to FIGS. 1 and 2, the off-road vehicle 30 preferably comprises a steering mechanism 104. The steering mechanism 104 in the illustrated arrangement includes a steering wheel 106. The steering wheel 106 is affixed to the frame 32 steering movement in front of the seat 68 for the driver, which is located or the left-hand side of the illustrated off-road vehicle 30.

The steering mechanism 104 preferably comprises a steering shaft 110 coupled with the steering wheel 106, a tie-rod 108 coupled with the front wheels 56, and a rack-and-pinion assembly 112 that connects the steering shaft 110 to the tie-rod 108. The rack-and-pinion assembly 112 converts the pivotal movement of the steering wheel 106 to an axial movement of the tie-rod 108. The rack-and pinion assembly 112 preferably is housed in a gear case. The driver can operate the steering wheel 106 when seated on the seat 68.

The tie rods 108 preferably are connected to rod sections that extend outward from the rack and pinion assembly 112. In some arrangements, an inner ball joint couples the rod sections to the respective tie rods 108. Also, an outer ball joint preferably couples each tie rod 108 to a knuckle arm (not shown) that is associated with each front wheel 56. Each knuckle arm is coupled with a king pin (not shown) that extends from an axle of the front wheel 56. The tie-rods 108 move axially along with the rod sections when the steering shaft 110 is rotated.

As described above, the vehicle 30 preferably includes four wheel independent suspension. In such arrangements, as discussed above, the outer ball joints can move around on an imaginary sphere that is defined about the inner ball joint. In other words, the outer ball joint can move transversely as well as around the surface of the imaginary sphere. The knuckle are is only capable of moving along an arc defined by the suspension link connecting the wheel to the frame. The knuckle arm, thus, rotates about the king pin and causes bump steering unless the curve defined by the suspension link is consistent with the sphere defined about the inner ball joint. In addition, bump steering causes changes in the toe angle of the front wheels.

With reference to FIGS. 1 and 2, a hood or bonnet 134 surrounds at least a front portion of the main frame 34, the front frame 36, the front wheels 56 and a major portion of the steering mechanism 104. A dashboard 136 preferably depends from a rear portion of the hood 134. The dashboard 136 faces toward the passenger compartment and a meter unit preferably is disposed in a central portion of the dashboard 136. The meter unit preferably incorporates meters and/or gauges such as, for example, a speedometer, a fuel level meter and the like. Because of this meter unit arrangement, the driver can easily view the individual meters at a glance.

With reference to FIGS. 1-6, the off-road vehicle 30 has a prime mover that powers the off-road vehicle 30 and particularly the front and rear wheels 56, 58. The prime mover preferably is an internal combustion engine 142. Alternatively, an electric motor can replace the engine 142. Engine power is transferred to the front and rear wheels 56, 58 through a suitable transmission 144 and a suitable drive mechanism 146. In the illustrated arrangement, the engine 142 and the transmission 144 are coupled together to form an engine unit 148. The illustrated transmission 144 advantageously includes an endless V-belt transmission mechanism and a change speed mechanism. The illustrated drive mechanism 146 comprises a forward driveshaft 150 extending forward from the engine unit 148, a rear driveshaft 152 extending rearward from the engine unit 148, a front differential 153 coupled with front axles (not shown) of the front wheels 56, and a rear differential 154 coupled with rear axles (not shown) of the rear wheels 58.

As shown in FIGS. 1-3 and 5, the engine unit 148 preferably is positioned generally lower than the seat unit 66 and generally in the space defined by both of the seats 68. The illustrated engine 142 operates on a four-stroke combustion principle. The engine 142 preferably has a single cylinder block 158 (FIG. 3) that extends generally upward and rearward from a lower section of the engine unit 148. That is, the cylinder block 158 has a cylinder axis CA that inclines from a horizontal plane or a vertical plane with a certain angle. The illustrated cylinder axis CA inclines from vertical at approximately 45 degrees.

The cylinder block 158 defines a cylinder bore therein. A piston 159 (FIG. 4) is reciprocally disposed within the cylinder bore. A cylinder head 160 closes an upper end of the cylinder bore to define a combustion chamber together with the cylinder bore and the piston 159.

The cylinder head 160 also defines a pair of intake ports 162 and a pair of exhaust ports 166 both communicating with the combustion chamber. An intake valve is provided at each intake port 162 to selectively open the combustion chamber to an air intake system 164. In the illustrated arrangement, the air intake system 164 is coupled with the intake ports 162 at a front surface 165 of the cylinder head 160 that generally faces forward and upward. The front surface 165 is positioned generally in the space defined between the seats 68. The air intake system 164 introduces air into the combustion chamber through the intake ports 162 when the combustion chamber is opened to the intake system 164 by the intake valves. An exhaust valve also is provided at each exhaust port 166 to selectively open the combustion chamber to an exhaust system 168. In the illustrated arrangement, the exhaust system 168 is coupled with the exhaust ports 166 at a rear surface 169 of the cylinder head 160 that is positioned opposite to the front surface 165 and generally faces rearward and downward. The exhaust system 168 routes exhaust gases from the combustion chamber to an outside location when the combustion chamber is opened to the exhaust system 168.

A cylinder head cover 170 is attached to the cylinder head 160 to enclose one or more camshafts together with the cylinder head 160. The camshafts are journaled at least on the cylinder head 160 and actuate the intake and exhaust valves at timings that vary generally in proportion to the engine speed.

A lower portion of the engine unit 148, which is the balance of the engine unit 148, comprises a crankcase 174 which closes a lower end of the cylinder bore. A crankshaft 176 is journaled to extend transversely within the crankcase 174 and is coupled with the piston 159. The crankshaft 176 thus rotates with the reciprocal movement of the piston 159. The crankshaft 176 preferably drives the camshafts via a camshaft drive mechanism.

Figure 4:
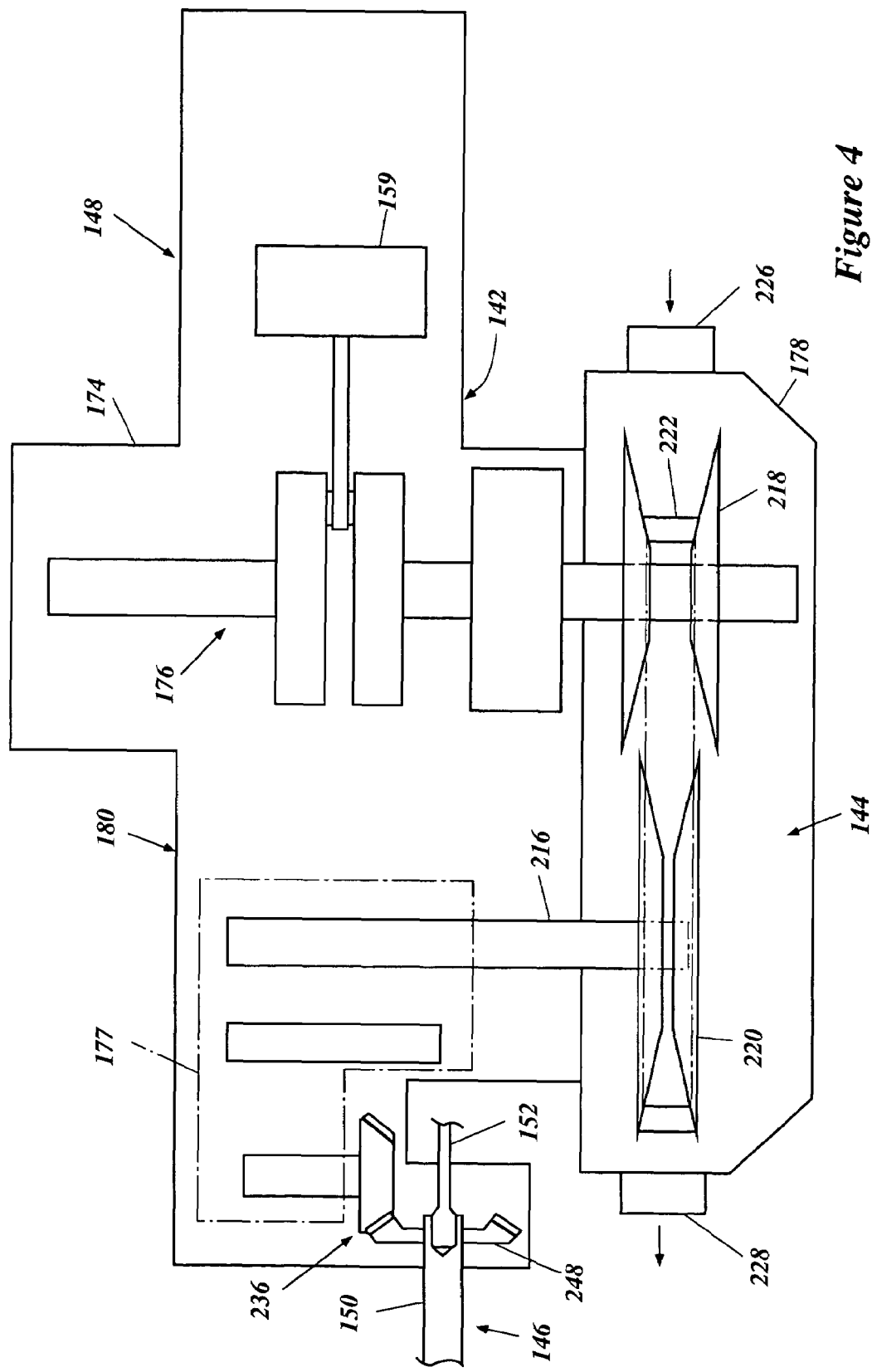
FIG. 4 is a schematic top plan view of the engine unit.

With continued reference to FIG. 4, the crankcase 174 also houses an input shaft for a shiftable portion of the transmission 144. The input shaft is positioned forward of the crankshaft 176. The lower portion of the engine unit 148 also comprises a V-belt housing 178 which is positioned next to the crankcase 174 in the illustrated arrangement. Moreover, in the illustrated arrangement, the V-belt housing 178 is defined on the left-hand side of the crankcase 174. The V-belt housing 178 houses the V-belt transmission mechanism (e.g., a continuously variable transmission). Thus, the lower portion of the engine unit 148 (which comprises at least the crankcase 174 and the V-belt housing 178) also defines at least in part, a transmission housing 180. The transmission 144 is described in greater detail below.

With reference to FIGS. 1-3, the illustrated air intake system 164 extends forward to a location under the hood 134 from the intake ports 162 of the engine 142. The intake system 164 preferably comprises a throttle body or carburetor 182, an accumulator or plenum chamber 184, an air intake duct 186 and an air cleaner unit 188.

The throttle body 182 is connected to the intake ports 162 through an air intake conduit 192. The throttle body 182 comprises a throttle valve 194 that regulates or meters a rate of airflow amount delivered to the combustion chamber. The throttle valve 194 preferably is a butterfly valve and generally is journaled for pivotal movement. The magnitude of airflow depends on an angular position of the throttle valve 194; when the throttle valve 194 is closed or substantially closed, minimal airflow results, while when the throttle valve 194 is fully opened or substantially fully opened, maximum airflow results.

An accelerator pedal is disposed at a front end of the floorboard 50 for pivotal movement to control the position of the throttle valve 194. A throttle cable connects the accelerator pedal to the throttle valve 194. The driver thus can control the throttle valve 194 by adjusting an angular position of the accelerator pedal by foot. Normally, the greater the throttle valve 194 opens, the higher the rate of airflow amount and the higher the engine speed. Other suitable mechanisms and/or electrical connections also can be used to transmit operator demand to the throttle valve or engine.

The throttle body 182 can be in the form of a carburetor, as a charge former. As such, the throttle body 182 also includes a fuel measurement mechanism that measures an amount of fuel mixed with the air in accordance with the rate of airflow amount. Because of this fuel measurement mechanism, an air/fuel charge that has a desired air/fuel ratio can be provided to the combustion chamber. The fuel is delivered to the throttle body 182 from a fuel tank (not shown) preferably disposed on the frame 32.

Other charge formers such as, for example, a fuel injection system can be used. The fuel injection system can include a fuel injector spraying fuel directly into the combustion chamber or into a portion of the air intake system downstream of the throttle valve. Such fuel injection can be conducted in accordance with the rate of airflow amount under control of an electronic control unit (ECU), for example. With reference to FIGS. 1 and 2, the accumulator 184 can be coupled with an inlet of the throttle body 182. The accumulator 184 generally forms a portion of the intake duct 186 in the broad sense of the term but provides a larger volume or cross-sectional area as compared to the balance of the intake duct 186. Such a construction allows air to accumulate prior to delivery to the throttle body 182. As best shown in FIG. 1, the accumulator 184 is generally shaped as an arcuate configuration.

Such a construction advantageously smoothes the delivery of air to the engine. Furthermore, because the accumulator 184 has a relatively large volume and is disposed next to the throttle body 182, the intake efficiency of the induction system is greatly improved. That is, sufficient air can be quickly supplied to the engine 142 even when the engine is being operated at a relatively high engine speed.

In the illustrated arrangement, the air intake conduit 192, the throttle body 182 and the accumulator 184 together extend forwardly of the engine within a region defined between the seats 68. Upper portions of the throttle body 182 and the accumulator 184 preferably are positioned slightly higher than the top ends 82A of the seat cushions 72. A forward-most portion of the accumulator 184 turns downward at or just forward of the forward end of the seat assemblies.

Because of this arrangement, the throttle body 182 and at least a portion of the accumulator 184 are interposed between the seat assemblies and are positioned within, or just adjacent to, the space 70. Thus, the throttle body 182 and the accumulator 184 are positioned within a protective region of the vehicle that is located higher than a lowermost surface of the frame assembly or the floorboard 50. Such positioning reduces the likelihood that dirt and other road debris that may be kicked up underneath the vehicle will damage the throttle body 182 or the accumulator 184. Such placement also facilitates servicing of these components and protects these components from water damage while fording a stream, a mud bog or the like.

The illustrated accumulator 184, which is positioned within the most downstream portion of the illustrated intake duct 186, ends above a lowermost surface defined by the rear frame section 38. The balance of the air intake duct 186, which has a smaller volume or cross-sectional area than the accumulator 184, preferably comprises a downstream section 200, a middle section 202 and an upstream section 204, which are provide a contiguous air flow path in the illustrated embodiment. The downstream section 200 extends downwardly from the accumulator 184 to a lowermost portion of the rear frame section 38. The middle section 202 extends forwardly in a generally horizontal direction from a lower end of the downstream section 200.

With reference to FIG. 5, in the illustrated arrangement, the middle section 202 extends through a tunnel defined by the projection 52 of the floorboard 50. Because of this arrangement, the middle section 202 advantageously is positioned higher than the horizontal section of the floorboard 50, which greatly reduces the likelihood of damage from rocks, sticks, road debris or the like. Furthermore, the driver and/or the passenger are able to maintain a good riding body position because the horizontal section 51 is positioned generally vertically lower than the middle section 202. Moreover, the illustrated arrangement contributes to a lower center of gravity for the off-road vehicle 30 because the height of the seats 68 does not need to be increased to accommodate the middle section 202 or another portion of the air induction system.

The middle section 202 preferably ends at a location close to the front frame section 36. The upstream section 204 extends generally vertically upward from the middle section 202. In addition, the upstream section 204 preferably is positioned within a space defined below the hood 134. To increase the protection from ingestion of water, the forward most portion of the upstream section 204 extends forward and slightly downward along a lower surface of the hood 134.

The air cleaner unit 188 preferably is attached at an upstream end of the intake duct 186 and extends generally along the lower surface of the hood 134. The illustrated air cleaner unit 188 has a relatively large volume and has a cleaner element therein. The air cleaner unit 188 also has an air inlet port. Ambient air is drawn into the air cleaner unit 188 through the air inlet port and passes through the filtration element such that foreign substances such as, for example, dust, mud or water can be substantially removed from the air that is being introduced into the engine.

The air, which has been cleaned in the cleaner unit 188, flows to the accumulator 184 through the intake duct 186. The airflow amount is regulated by the throttle valve 194 in the throttle body 182. Simultaneously, an amount of fuel is measured by the fuel amount measurement mechanism in the throttle body 182 in response to the air amount. An air/fuel charge that has a proper air/fuel ratio is formed and is delivered to the combustion chamber 163 when the intake valves open the intake ports 162. The air/fuel charge is ignited by an ignition system (not shown) and burns within the combustion chamber 163. The burning of the charge causes expansion of the gases and increased pressure that results in movement of the piston. The crankshaft 176 is rotated within the crankcase 174 by the movement of the piston.

With reference to FIGS. 1-3, the burnt charges, i.e., exhaust gases are discharged through the exhaust system 168. The illustrated exhaust system 168 preferably comprises a pair of exhaust conduits 208 and a muffler 210. The exhaust conduits 208 are coupled with the respective exhaust ports 166 and extend generally rearward. The exhaust conduits 208 extend parallel to each other. Preferably, the exhaust conduits 208 have a wavy shape that serpentines up and down, as shown in FIGS. 1 and 2. Rearward ends of the exhaust conduits 208 preferably extend beyond a rear end of the rear frame 38. The muffler 210 is coupled with the rear ends of the exhaust conduits 208.

The muffler 210 preferably has a cylindrical shape. A center axis of the muffler 210 preferably extends generally transversely relative to the longitudinal center plane LC of the frame 32. The muffler 210 has a relatively large volume to reduce exhaust energy and noise. An outlet port 212 can be formed at a side surface which is on the left-hand side in the illustrated embodiment. Other arrangement can also be used. The exhaust gases flow through the exhaust conduits 208 and are discharged through the outlet port 212 of the muffler 210.

The engine 142 can have systems, devices, components and members other than those described above. For example, the illustrated engine 142 can employ a cooling system using water as a coolant to cool the engine 142.

With reference to FIGS. 1-4, the change speed mechanism 177 and the V-belt transmission mechanism together have a common output shaft 216. The output shaft 216 extends generally parallel to the crankshaft 176 at a location in front of the crankshaft 176. The output shaft 216 preferably extends through the crankcase 174 and the V-belt housing 178 and is journaled for rotation. The crankshaft 176 extends into the V-belt housing 178 and has a drive pulley 218 at an end thereof. The output shaft 216 has a driven pulley 220.

The drive and driven pulleys 218, 220 both comprise an axially fixed pulley member and an axially movable pulley member that is axially movable along either axis of the crankshaft 176 or the output shaft 216. Together, the pulley members form a V-shaped valley that expands and contracts with changes in engine speed.

An endless V-belt 222, which has a V-configuration in section, is wound around the drive pulley 218 and the driven pulley 220. Other types of endless transmitters, such as a chain, can also be used. Normally, the movable pulley member of the drive pulley 218 is urged to stay apart from the fixed pulley member by the bias force of a bias member such as, for example, a spring. The movable pulley member of the driven pulley 220 is urged to stay close to the fixed pulley member by the bias force of a bias member such as, for example, a spring.

Each movable pulley member can move axially against the bias force by a clutch mechanism which is provided on either pulley 218, 220. The clutch mechanism acts by the centrifugal force created when the crankshaft 176 or the output shaft 216 rotates at a speed higher than a preset speed. The change in diameter of one pulley causes a corresponding change in the other pulley. Thus, both diameters of the drive pulley 218 and the driven pulley 220 vary to automatically change the transmission ratio between the drive pulley 218 and the driven pulley 220 normally in response to the engine speed.

With reference to FIGS. 1-3, the V-belt housing 178 preferably has an air inlet port 226 at a rear end and an air outlet port 228 at a front end. An air inlet duct 230 (FIGS. 1 and 2) preferably is coupled to the inlet port 226, while an air outlet duct 232 preferably is coupled to the outlet port 228. The inlet duct 230 extends generally rearward and upward and generally behind the seat back 74 on the left-hand side. The inlet duct 230 has an inlet opening 233 that opens forward and is positioned higher than top surfaces of the seat cushions 72. The outlet duct 232 extends generally upward and rearward and generally along a bottom surface of the seat cushion 72 on the left-hand side. The outlet duct 232 has an outlet opening 234 that opens generally rearward.

Cooling air is introduced into the V-belt housing 178 through the inlet duct 230 and the air inlet port 226 while the crankshaft 176, the output shaft 216 and the drive and driven pulleys 218, 220 rotate. The air then is discharged through the outlet port 228 and the outlet duct 232. In some arrangements, one or both of the pulleys can be provided with fan blades to help induce higher speed air flow as the engine speed increases. Other embodiments can provide a ram air type of air flow. Having circulated with the belt chamber of the transmission, the air then is discharged through the outlet port 228 and the outlet duct 232.

With reference to FIGS. 1-3, the engine output that has been transferred to the output shaft 216 through the V-belt mechanism is transferred to the drive mechanism 146 through the change speed mechanism 177. This mechanism preferably is configured to provide a parking state, a high speed forward state, a neutral state, a low speed forward state, and a reverse state. The mechanism preferably comprises a suitable gear train that allows an operator to select among at least the above-mentioned operating states. A bevel gear assembly 236 can be coupled with the mechanism.

The mechanism also comprises a shift lever unit 240 that extends from the crankcase 174. The shift lever unit 240 preferably is connected to the rest of the change speed mechanism 177 within the crankcase 174 through a suitable linkage (not shown). The shift lever unit 240 preferably is placed generally within the space defined between the seats 68. The illustrated lever unit 240 is positioned generally at the forward-most portion of the space. Such placement facilitates ease of use.

The shift lever unit 240 preferably comprises a lever 244 and a lever cover 246. The lever 244 preferably is affixed to the frame 32 directly or indirectly for pivotal movement around a fulcrum. In one variation, the shift lever unit 240 can comprise a lever that moves axially. The driver thus can control the change speed mechanism in the crankcase 174 and vary the transmission operating state among at least the parking state, the high speed forward state, the neutral state, the low speed forward state, and the reverse state by operating the lever 244.

Because of the advantageous configuration of the drive train relative to the shift lever unit 240, the shift lever unit 240 is positioned close proximity to the change speed mechanism of the transmission 144. The linkage thus can be short enough to make the change speed mechanism compact and also to improve the feeling that the driver might have when operating the shift lever unit 240.

With reference to FIGS. 1-4, the output of the change speed mechanism 177 is transferred to the drive mechanism 146 through the bevel gear 236. In the illustrated arrangement, the bevel gear 236 is coupled with a forward intermediate shaft 248. The forward drive shaft 150 is pivotally coupled to the forward intermediate shaft 248 through a universal joint 250. That is, the universal joint 250 comprises a first yoke 252, a second yoke 254 and a cross pin 256 pivotally coupling the first and second yokes 252, 254. The forward driveshaft 150 is coupled with a forward differential input shaft 262 (FIG. 4) of the forward differential 124. The forward differential input shaft 262 is coupled with the front wheels 56 through a differential mechanism formed within the forward differential 124.

In the illustrated arrangement, a rear intermediate shaft 258 also is connected to the bevel gear 236 through a suitable connection. The rear driveshaft 152 is connected to the rear intermediate shaft 258 through a splined coupling 260. Other couplings or a unitary shaft can also be used. The rear driveshaft 152 is coupled with a rear differential input shaft (not shown) of the rear differential 154. The rear differential input shaft preferably is coupled with the rear wheels 58 through another differential mechanism formed within the rear differential 154.

The off-road vehicle 30 preferably has other devices, components and members. For example, the differentials can be selectively lockable such that the differential function can be eliminated on demand. Moreover, a brake system can be provided to slow or stop rotation of the wheels 56, 58 or another drive train component (e.g., the drive shafts). A brake pedal 270 (FIG. 5) can be disposed next to the accelerator pedal 196 and can be connected to brake units that are coupled with the wheels 56, 58. In some arrangements, the brake units can comprise disk brake configurations. The driver thus can stop the off-road vehicle 30 by operating the brake pedal 270.

In the illustrated arrangement, the engine 142 is located generally rearward of the change speed mechanism including the output shaft 216. Moreover, the engine is positioned generally rearward of, and lower than, the seating area. Thus, heat generated by the engine 142 can be substantially isolated from the driver and/or the passenger, and particularly isolated from the feet of those persons both when seating and when mounting or dismounting from the vehicle. In addition, the cylinder block 158, the cylinder head 160 and the cylinder head cover 170 in this arrangement generally are directed rearward and are positioned generally rearward of the occupants. Thus, it is very unlikely that the engine heat will affect the occupants of the vehicle.

The exhaust system 168 carries a great deal of heat as well while the intake system 164 and the charge former, e.g., the throttle body 182, generally do not generate or conduct much heat. The intake system 164 and the charge former are generally protected from heat carried by the exhaust system 168 because the exhaust system 168 is positioned opposite to the intake system 164 in the illustrated arrangement. Thus, the engine heat and the exhaust heat can be generally isolated from the intake system 164 during forward operation of the off-road vehicle 30. The temperature of the intake air, therefore, is not greatly affected by the heat generated during operation of the off-road vehicle 30 and engine output efficiency can be kept in good condition. Along these lines, placement of a radiator preferably is generally below the air intake such that heat generated in the region of the radiator does not adversely affect engine performance through heating of the air inducted into the engine.

Furthermore, in the illustrated intake system 164, the intake system 164 generally does not extend along a heat generating or conducting surface of the engine 142. Thus, the engine heat is generally isolated from the intake system 164 in this arrangement. Also, the illustrated air cleaner 188 is greatly spaced from the engine 142. As such, any air that is heated by the engine 142 and the exhaust system 168 will not be drawn into the air intake system 164, which improves the engine output efficiency. Additionally, due to the elevated nature of the air inlet and air cleaner 188, water also is very unlikely to be drawn into the intake system 164. Furthermore, because the air cleaner 188 is positioned below the hood 134, water is unlikely to splash its way into the air cleaner.

As illustrated, the exhaust conduits 208 extend along a relatively lower portion of the off-road vehicle 30 in the illustrated arrangement because the exhaust conduits 208 are directed generally downward and rearward instead a wrapping around from a forward or lateral surface of the engine. The exhaust conduits 208, thus, are sufficiently spaced apart from the driver and/or the passenger. As a result, the seats 68 can be positioned closer to the engine 142, which allows a narrower overall construction for the vehicle or a closer mounting of the split seats 68.

Framework and Related Part of Suspension Mechanisms

With continued reference to FIGS. 1, 2, 5 and 6, and with further reference to FIGS. 7-13, the frame 32 and portions of the front and rear suspension mechanisms 60, 62 are described in greater detail below.

Figure 8:
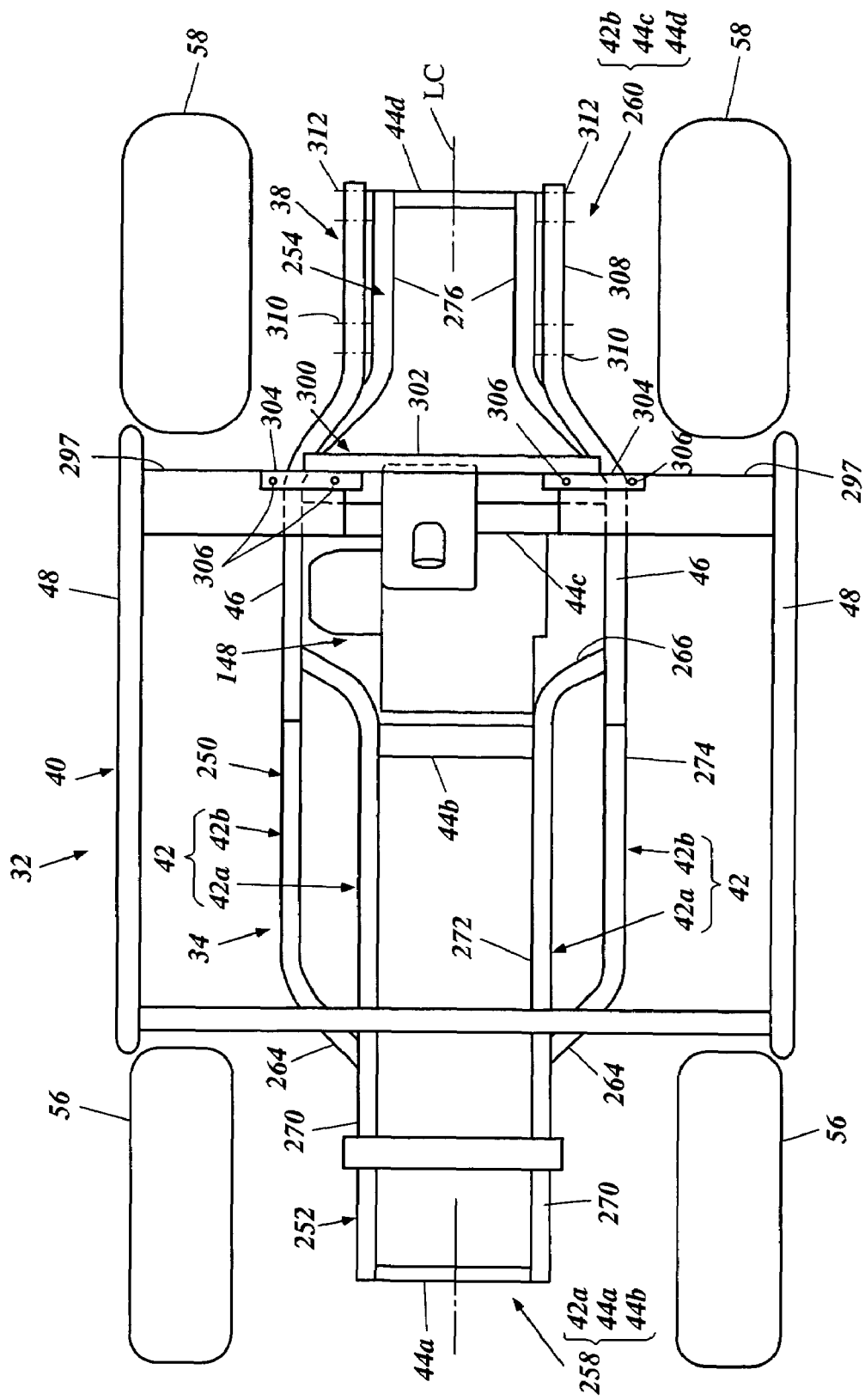
FIG. 8 is a top plan view of the frame, wherein four wheels of the off-road vehicle also are shown.
Figure 9:
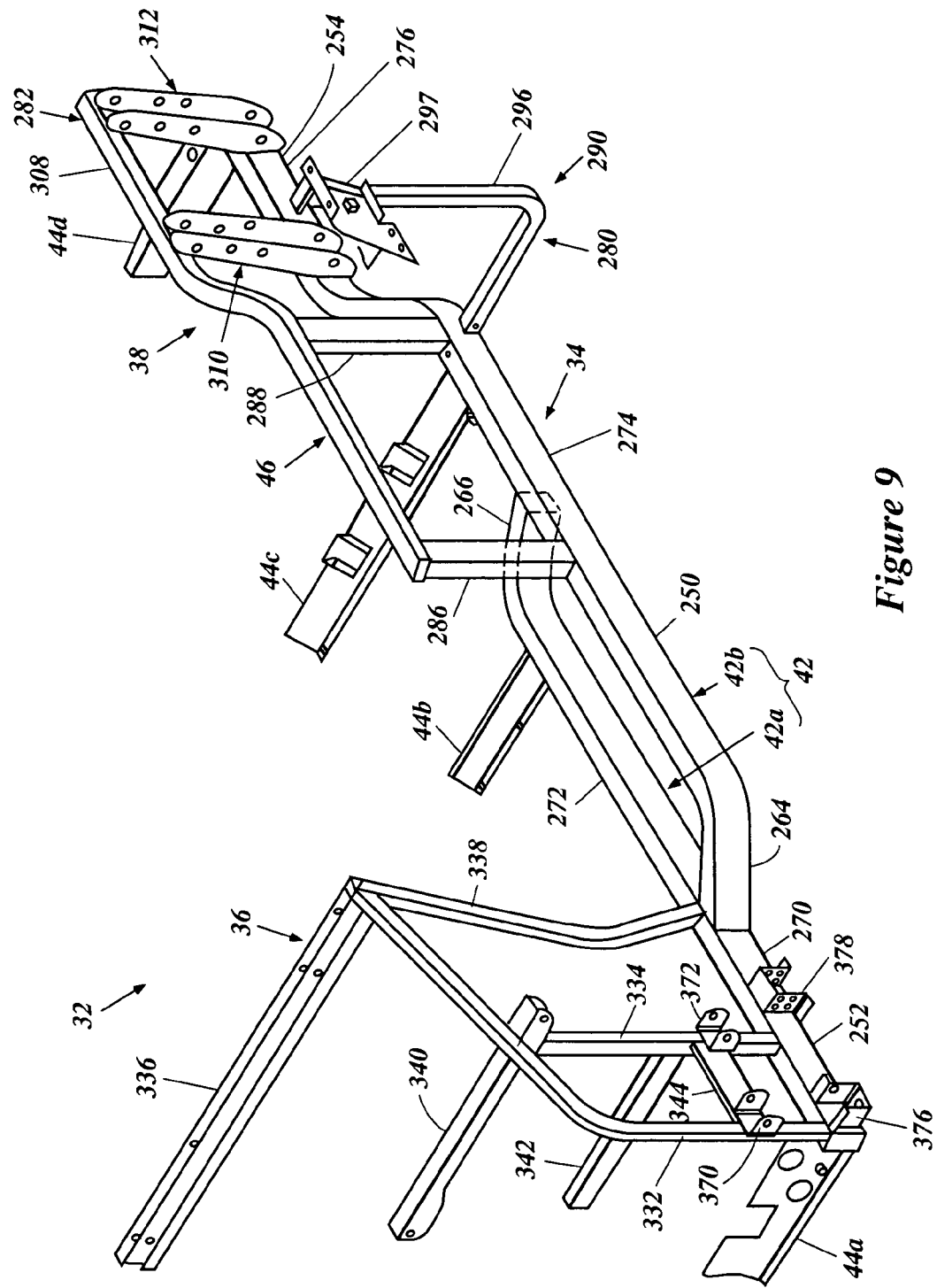
FIG. 9 is a partial perspective view of a left-hand side of the frame.

As shown in FIGS. 2, 8 and 9, the main frame 34 extends fore to aft along the longitudinal center plane LC of the frame 32. The main frame 34 preferably comprises a center part 250, a front part 252 and a rear part 254. The center part 250 is positioned between the front and rear parts 252, 254 and generally under the passenger compartment defined by the compartment frame 40 and the floorboard 50. The center part 250 preferably is wider than either the front or rear part 252, 254 so as to support the floorboard 50.

The front part 252 is positioned at the front end of the main frame 34 and supports the front wheels 56 via the front suspension mechanism 60. The rear part 254 is positioned at the rear end of the main frame 34 and supports the rear wheels 56 via the rear suspension mechanism 60.

The illustrated main frame 32 can also be described as comprising a first group 258 of frame members and a second group 260 of frame members. The frame members belonging to the first group 258 can include the front members 42a and the first and second cross members 44a, 44b. The front members 42a are spaced apart from each other so as to interpose the longitudinal center plane LC and extend generally parallel to each other. The first and second cross members 44a, 44b are spaced apart fore to aft from each other and connect the front members 42a.

The frame members belonging to the second group 260 can include the rear members 42b and the third and fourth cross members 44c, 44d. The rear members 42b are spaced apart from each other so as to interpose the longitudinal center plane LC and extend generally parallel to each other. The third and fourth cross members 44c, 44d are spaced apart fore to aft from each other and connect the rear members 42b.

The first and second groups 258, 260 are offset fore to aft relative to each other and overlap with each other. For example, in the illustrated embodiment, the rear section of the first group 258 and a front section of the second group 260 overlap. In the illustrated arrangement, the rear members 42b generally extend outside of the front members 42a. In other words, the rear members 42b extend farther from the longitudinal center plane LC than the front members 42b.

Each rear member 42b preferably has a front end portion 264 that is bent inwardly toward the front member 42a and is connected to the front member 42a. For example, but without limitation, the front end portion 264 can be welded, bolted, screwed, or bonded to the front member 42a. The welded portion of the rear member 42b is located slightly forwarder than a front end of the compartment frame 40.

Each front member 42a preferably has a rear end portion 266 that is bent outwardly toward the rear member 42b and is connected to the rear member 42a, in a manner described above with reference to the connection between the front end portion 264 and the front member 42a. The connected portion of the front member 42a is located within a compartment area defined by the compartment frame 40. Thus, the first and second groups 258, 260 are combined together to form the single main frame 34. Also, the main frame 34 formed with the combined first and second groups 258, 260 preferably lie generally symmetrically relative to the longitudinal center plane LC.

Front portions 270 of the front members 42a form the front part 252 of the main frame 34 as well as a front section of the first group 258. The rear members 42b extend rearward toward a rear end of the compartment area. The rear portions 272 of the front members 42a, which form the rear section of the first group 258, and middle portions 274 of rear members 42b together form the center part 250.

Rear portions 276 of the rear members 42b preferably are bent inwardly toward the longitudinal center plane LC behind the compartment area, then extend rearward generally along the longitudinal center plane LC. In the illustrated embodiment, the rear portions 276 of the rear members 42b form the rear part 254 of the main frame 34.

The front end portions 264 of the rear members 42b and the portions of the rear members 42b that are positioned in front of the connections to the front members 42a, form the front section of the second group 260. The remainder of the rear members 42b form a rear section of the second group 260.

The front section of the first group 258 preferably is interposed between the front wheels 56. Also, the rear section of the second group 260 preferably is interposed between the rear wheels 58.

The engine unit 148 preferably is mounted on and affixed to the second cross member 44b and the third cross member 44c directly or with one or more bracket members (not shown). Preferably, the floorboard 50 generally extends over the rear portions 272 of the front members 42a and the middle portions 274 of the rear members 42b.

As thus described, in the illustrated arrangement, the rear end portions 266 of the front members 42a and the front end portions 264 of the rear members 42b are bent. However, the curvature of each end portion 264, 266 is relatively small. Also, each member 42a, 42b has only one bend. Thus, the members 42a, 42b retain sufficient stiffness against bending, even though they include a bend.

Also, by having such bends, the members 42a, 42b can be spaced apart from each other, thereby providing enhanced support for the floorboard 50. Thus, the combination of the first and second groups 258, 260 of frame members can contribute to provide sufficient stiffness of the frame 34 without excessive increases in production costs.

In addition, the manufacture of illustrated main frame 34 remains practicable because of the relatively small bend used in the front and rear end portions 264, 266. Additionally, this configuration allows for conventional coupling of the first and second groups 258, 260 with methods such as a welding process. Thus, the production cost of the off-road vehicle 30 can remain practicable.

In one alternative, the first and second groups 258, 260 can be reversed such that the front section of the first group 258 defines a rear part of the main frame 34 and the rear section of the second group 260 defines a forward part of the main frame 34.

Optionally, the first group 258 can have members extending farther from the longitudinal center plane LC than members of the second group 260. That is, the members 42b can be placed more inward than the members 42a.

In another alternative, the bends at the front ends 264 of the members 42b and/or the rear ends 266 of the members 42a can be omitted. For example, the members 42a, 42b lie against each other. Optionally, the contacting portions of these members can be connected with each other entirely or partly. For example, these contacting portions can be welded together.

Preferably, the illustrated members 42a, 42b are generally rectangular in section with generally vertical surfaces and generally horizontal surfaces. The vertical surfaces preferably are longer than the horizontal surfaces in the illustrated arrangement. Because of this configuration, the members 42a, 42b can have high stiffness in bending about a generally horizontal bending axis. In some arrangements, the horizontal surfaces can be longer than the vertical surfaces. In further variations, the members 42a, 42b can have a circular or oval section. Additionally, the members 42a, 42b can have configurations other than the tubular shape such as, for example, a U or C-shaped section. Additionally, the front and rear frames 36, 38 can have the optional shapes noted above with respect to the main frame 34.

With reference to FIGS. 1, 2, 7-9 12 and 13, the rear frame 38 preferably comprises a pair of seat frame sections 280 (FIGS. 7 and 8) and a pair of rear suspension support sections 282. Each seat frame section 280 preferably is formed in a front part of the rear frame 38 and defines the foregoing seat pedestal. Each rear suspension support section 282 preferably is formed in a rear part of the rear frame 38 and supports the rear suspension mechanism 62.

Each seat frame section 280 preferably includes a front portion of the foregoing rear frame member 46, front and rear struts 286, 288 and a seat pedestal unit 290. The rear frame member 46 has a shape similar to the rear half of the rear member 42b and generally extends above and parallel to the rear half of the rear member 42b. The illustrated rear frame member 46 is a member and has a rectangular shape in section. Other configurations, as noted above, can also be used.

The front and rear struts 286, 288 extend vertically from the rear member 42b toward the rear frame member 46 to couple the rear frame member 46 to the rear member 42b. Each strut 286, 288 preferably is U-shaped in section. The front strut 286 can be connected, by welding or other means for example, to a portion of the rear member 42b adjacent to the connection between the rear end portion 266 and the front end of the rear frame member 46. The rear strut 288 can be connected by welding or other means, for example, to a portion at a rear end of the middle portion 274 of the rear member 42b. Additionally, the rear strut 288 can be connected to a portion at a rearward portion of the rear frame member 46.

Each seat pedestal unit 290 preferably includes a plurality of members. One of the members can be a base member 296 that extends outward from the rear member 42b at the end of the middle portion 274 to the compartment member 48. Additionally, the base member 296 can extend upwardly to the frame: member 46. The base member 296 can have a rectangular shape in section, or any other shape.

Figure 7:
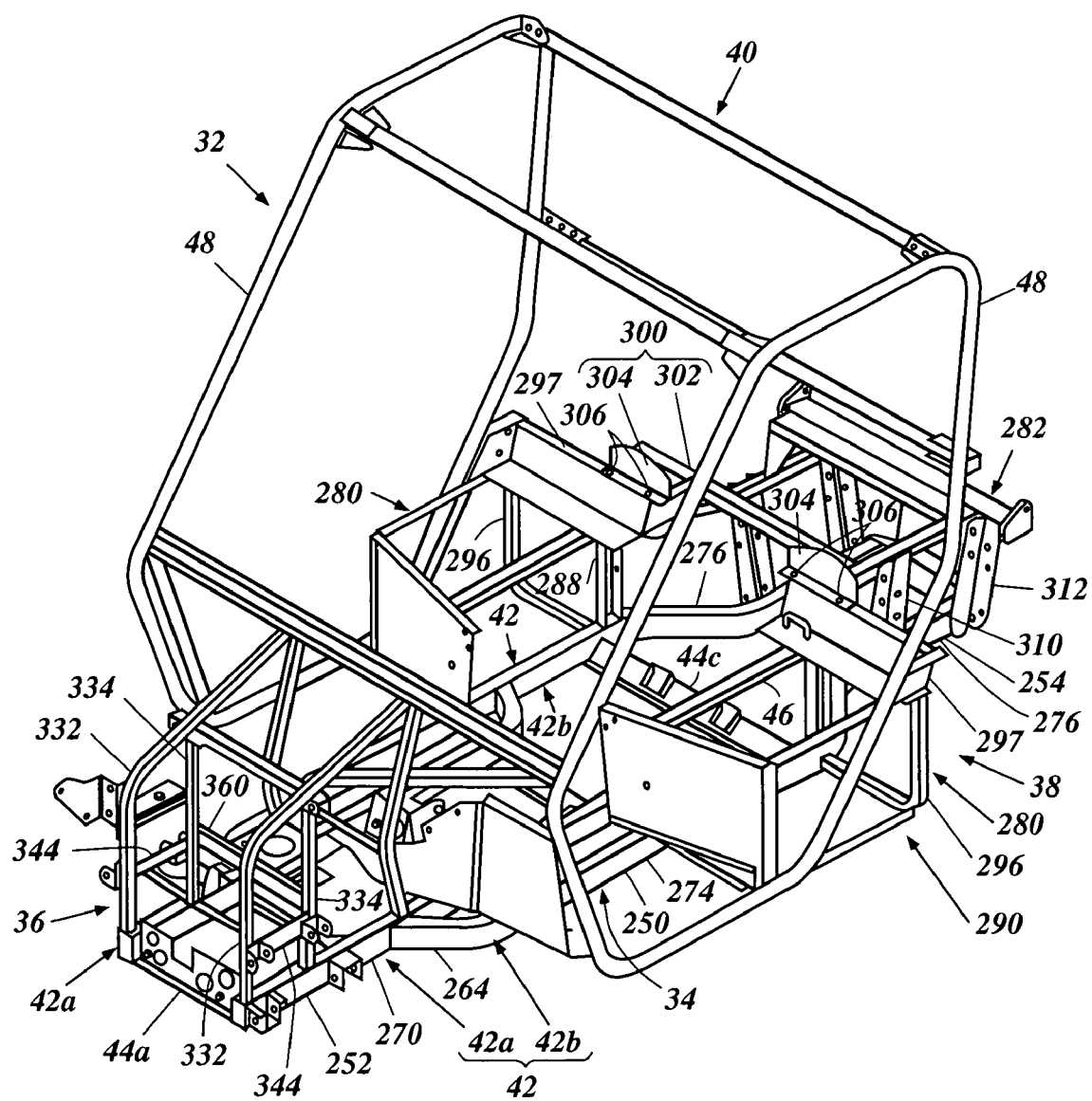
FIG. 7 is a perspective view of a portion of a frame of the off-road vehicle including the frame members of FIGS. 5 and 6.
Figure 12:
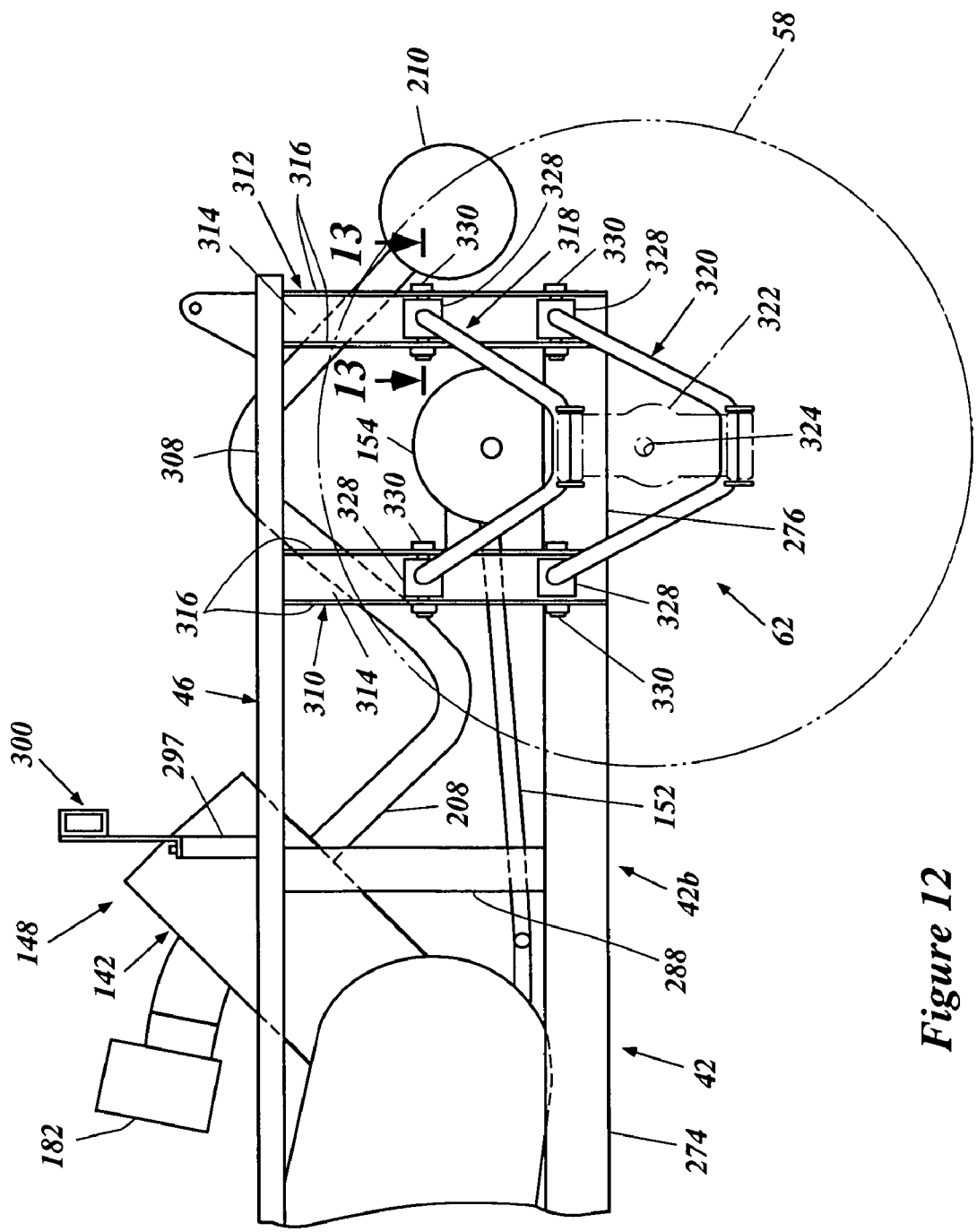
FIG. 12 is a partial left side elevational view of the frame in a rear area of the off-road vehicle, wherein a portion of a rear suspension mechanism also is shown.

With reference to FIGS. 7 and 12, the seat pedestal unit 290 can also comprise a rear pedestal member 297 that comprises a plurality panels. For example, the rear pedestal member 190 can comprise a plurality of pieces of sheet metal combined together and extending transversely between a portion of the rear frame member 46 and a top end of the base member 296. The sheet metal pieces preferably are welded with each other. Additionally, the seat pedestal member 297 preferably is welded to the rear frame member 46 and the rest of the seat support unit 290. The seat 68 can be positioned above the front portion of the rear frame member 46 and the seat support unit 290 including the seat pedestal member 297.

Inwardly-facing lateral sides of the respective seat pedestal members 297 are spaced apart from each other to interpose the longitudinal center plane LC therebetween. A reinforcement member 300 preferably extends between the seat pedestal members 297. The reinforcement member 300 preferably comprises a member 302 that has a rectangular shape in section and a pair of L-shaped brackets 304 disposed on both sides of the tubular bar 302. The illustrated brackets 304 can be welded to the tubular bar 302 so as to unitarily form the reinforcement member 300 together with the tubular bar 302. Other connection methods can also be used.

A further advantage is provided where the reinforcement member 300 is detachably affixed to the inward lateral sides of the seat pedestal members 297. For example, detachable connections can be provided at the brackets 304 by bolts 306. Other detachable connection devices can also be used. The illustrated tubular bar 302 of the reinforcement member 300 extends adjacent to the engine unit 148. As such, the reinforcement member 300 provides additional strength to the frame 32 and aids in protecting the engine unit 148, yet allows a mechanic or repair person to remove the reinforcement member 300 to access the portion of the engine unit 148 for maintenance or repairs.

In the illustrated embodiment, the reinforcement member 300 extends above the cylinder head cover 170 as shown in FIG. 5, for example. However, the reinforcement member 300 can extend along side of other portions of the engine unit 148 depending on the configuration and orientation of the engine unit 148.

Because the engine unit 148 is mounted on the second and third cross members 44b, 44c, the middle portion's 274 of the rear members 42b, the front portions of the rear frame members 46, the front and rear struts 286, 288, the seat pedestal unit 290 and the reinforcement member 300 extend adjacent to the engine unit 148, and together, generally surround the engine unit 148. Thus, the frame components 44b, 44c, 274, 42b, 46, 286, 288, 290, 300 cooperate to enhance stiffness of the frame 32, particularly portions thereof around the engine unit 148.

The cylinder head cover 170 and the cylinder head 160, which is disposed below the cylinder head cover 170, are detached for certain maintenance procedures. Because the tubular bar 302 of the reinforcement member 300 is positioned above the cylinder head cover 170, the detachable reinforcement member 300 can provide such a mechanic with easy access to the particular portions (i.e., cylinder head 160 and cylinder head cover 170) of the engine unit 148. Also, the reinforcement member 300 can be easily detached because the reinforcement member 300 is positioned above the engine unit 148. The mechanic only needs to remove the carrier 92 from an area around the reinforcement member 300.

In addition, the illustrated reinforcement member 300 can be easily detached and re-attached because of the simple fastening construction that only includes the bolts 306 and nuts, or other detachable connection devices. After re-attachment, the reinforcement member 300 again contributes to provide the stiffness of the frame 32 together with other frame members.

With continued reference to FIGS. 1, 2, 7-9, 12 and 13, rear wheels 58 depend from a rear-most portion of the frame 32 that includes a rear portion 308 of the rear frame 46 and the rear portion 276 of the rear member 42b on each side. As shown in FIG. 8, each rear portion 308 of the rear frame 46 extends slightly farther or more outward from the longitudinal center plane LC than each rear portion 276 of the rear member 42b. That is, the respective rear portions 308 are spaced apart from each other wider than the respective rear portions 276 which also are spaced apart.

A set of suspension support members or suspension retainers 310, 312 connect the rear portion 308 of the rear frame 46 and the rear portion 276 of the rear member 42b with each other on each side. The illustrated suspension support members 310, 312 can be welded to the rear frame 46 and the tubular member 42b to form part of the framework of the frame 32. The suspension support members 310, 312 are spaced apart from each other fore to aft and the support member 310 is positioned forwardly of the support member 312. Because of the offset arrangement of the rear frame 46 and the rear member 42b at the rear portions 308, 276, the suspension support members 310, 312 are slightly inclined outward and upward.

Figure 13:
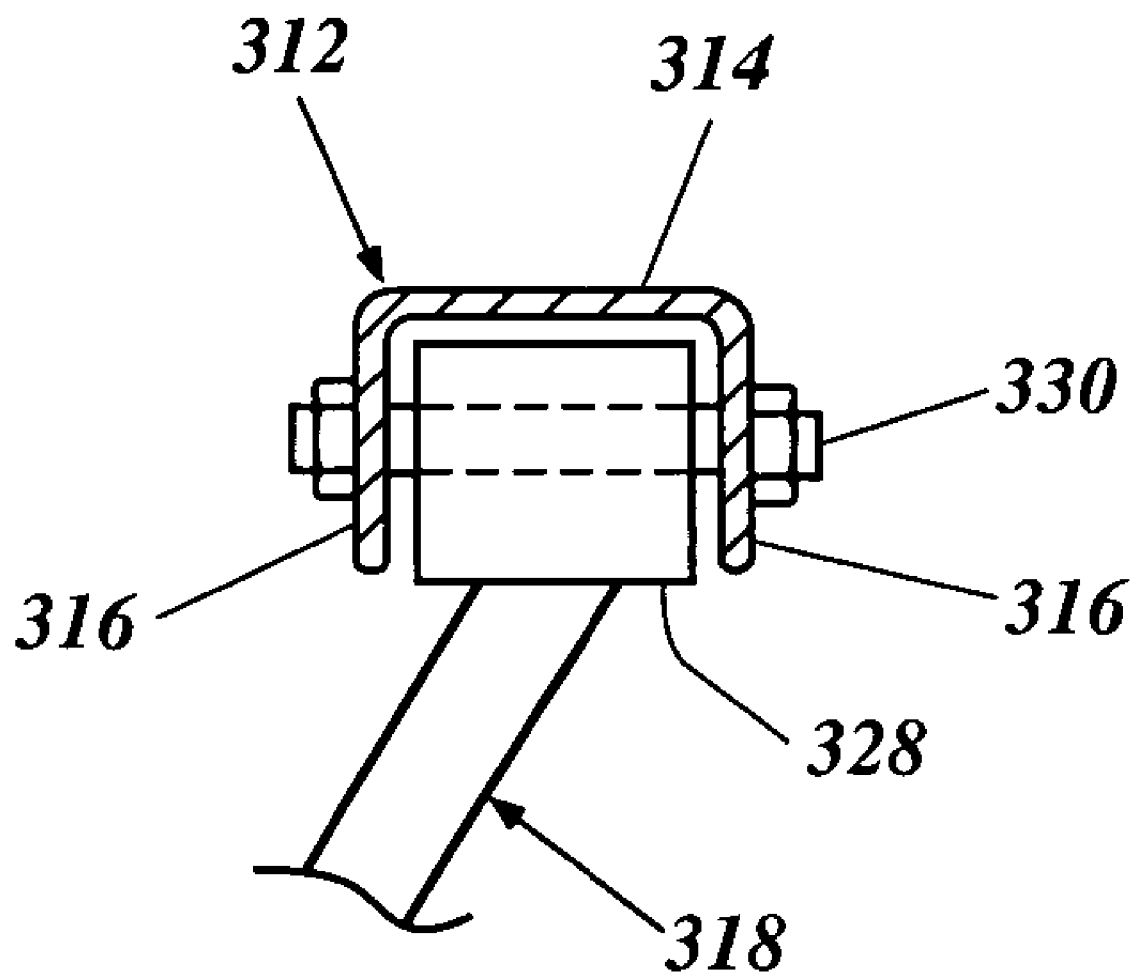
FIG. 13 is a sectional view taken along the line 13-13 of FIG. 12.

As shown in FIGS. 12 and 13, each support member 310, 312 is configured as a U-shape and thus has a bottom surface 314 and side surfaces 316. The bottom surface 314 faces the longitudinal center plane LC while the side surfaces 316 extend outward from the bottom surface 314 and lie generally normal to the bottom surface 314. The side surfaces 316 thus oppose each other. The bottom surface 314 abuts the rear frame 46 and the rear member 42b. The support members 310, 312 are affixed to the rear frame 46 and the rear member 42b at the bottom surfaces 314.

The rear suspension mechanism 62 on each side connects each rear wheel 58 with the frame 32 independently or separately from the rear suspension mechanism 62 on the other side. Each rear suspension mechanism 62 preferably is a double wishbone type that comprises a pair of rear suspension arms 318, 320, a link 322 and a damper or shock absorber (not shown).

Each suspension arm 318, 320 is generally configured as a V- or A-shape. The suspension arm 318 is disposed above the other suspension arm 320 and the link 322 connects the arms 318, 320 with each other. The pivot connection between each arm 318, 320 and the link 322 permits the resulting assembly to function as a parallelogram linkage system. The link 322 has an aperture 324 at a center portion thereof. The axle of the rear wheel 58 is journaled in the aperture 324. A top end portion 364a of the link 364 is coupled with the upper suspension arm 360, while a bottom end portion 364b of the link 364 is coupled with the lower suspension arm 362. The damper is disposed between the upper suspension arm 320 and the rear frame 38 to damp shock that occurs while the off-road vehicle 30 proceeds over rugged terrain.

The upper suspension arm 318 preferably is connected to mid portions of the suspension support members 310, 312. The lower suspension arm 320 is connected to bottom portions of the suspension support members 310, 312. Respective arm portions of the lower suspension arm 320 preferably are longer than respective arm portions of the upper suspension arm 318 because of the outwardly inclined arrangement of the support members 310, 312. That is, the upper portion of each suspension support member 310, 312 is positioned farther outward from the longitudinal center plane LC than the respective lower portions of the support members 310, 312. As a consequence of the different lengths in the suspension arms 318, 230, the axle of each rear wheel 58 extends generally horizontally as the respective suspension system moves up and down.

Each distal end of the suspension arms 318, 320 has a mount member 328. Each mount member 328 is interposed between the side surfaces 316 of the respective suspension support member 310, 312. A pin 330 extends through the corresponding side surfaces 316 and the mount member 328 at each mount structure to hold each suspension arm 318, 320 for pivotal movement.

The rear wheels 58 thus can swing up and down generally perpendicularly relative to the frame 32 and independently of each other while the off-road vehicle 30 proceeds over rugged terrain.

In alternative arrangements, the mount members 328 of the upper and lower suspension arms 318, 320 can be positioned at any level of the support members 310, 312. For example, the mount members 328 of the upper suspension arm 318 can be positioned toward the top end of the support members 310, 312. In this arrangement, the mount members 328 of the lower suspension arm 320 are shifted upward with the mount members 328 of the upper suspension arm 318.

The illustrated rear suspension mounting construction thus can provide various vertical positions (i.e., elevations) of the suspension arms 318, 320 without changing the a major portion of the fundamental framework of the off-road vehicle 30 or without requiring rearrangement of the fundamental framework. In one preferred arrangement, a plurality of apertures are spaced apart vertically on the side surfaces 316 of the support members 310, 312. One set of apertures can be selected to journal the mount members 328 so as to select the axle position at any desirable level.

In the illustrated arrangement, no specific brackets for the mount members 328 are necessary because the mount members 328 are directly affixed to the support members 310, 312. Thus, the number of weld joints, for example, can be reduced to keep the frame 32 strong. Production cost of the off-road vehicle 30 also can be reduced, accordingly. Additionally, the roll resistance of the off-road vehicle 30 while turning can be greatly improved where the support members 310, 312 are inclined outward and the lower suspension arm 320 is longer than the upper suspension arm 318.

With reference to FIGS. 1, 7 and 9-11, the front wheels 56 depend from a forward-most portion of the frame 32 that includes the front portions 270 of the front tubular members 42a and support members 332, 334. The support members 332, 334, however, are not specifically provided for supporting the front wheels 66 and are primarily a part of the framework of the front frame 36.

As shown in FIG. 9, each support member 332 extends generally vertically upward from the front member 42a and then turns rearward along the hood 134. The front support members 332 support a transverse member 336 together with another frame member 338. The rear support members 334 are spaced apart rearward from the front support members 332 and are disposed in front of the frame member 338. The rear support members 334 extend upward toward upper portions of the front support members 332 and support transverse members 340, 342. A reinforcement member 344 extends between the support members 332, 334 to reinforce those members 332, 334 on each side.

In the illustrated arrangement, the support members 332, 334, the transverse members 336, 340 and the frame member 338 each have a U-shaped or rectangular in cross-section. The reinforcement members 344 can be formed from pieces of sheet metal that have flat surfaces. Side surfaces 348, 350 of the support members 332, 334 can also be flat. Those frame components 332, 334, 338, 340, 342, 344 preferably are welded together at portions where the members meet. Other connections methods and/or structural members can also be used.

Additionally, a bumper member 356 (FIG. 1) extends forward and upward from the front end of the main frame 34 toward a location in front of the hood 134. As such, the bumper member 356 protects the frame 32, the hood 134 and other components disposed under or around the hood 134 from obstacles or the like.

The front suspension mechanism 60 on each side connects each front wheel 56 with the frame 32 independently or separately from the front suspension mechanism 60 on the other side. Like the rear suspension mechanism 62, each front suspension mechanism 60 preferably is a double wishbone type. The front suspension mechanism 60 preferably comprises a pair of front suspension arms 360, 362, a link 364 and a damper or shock absorber (not shown).

Figure 10:
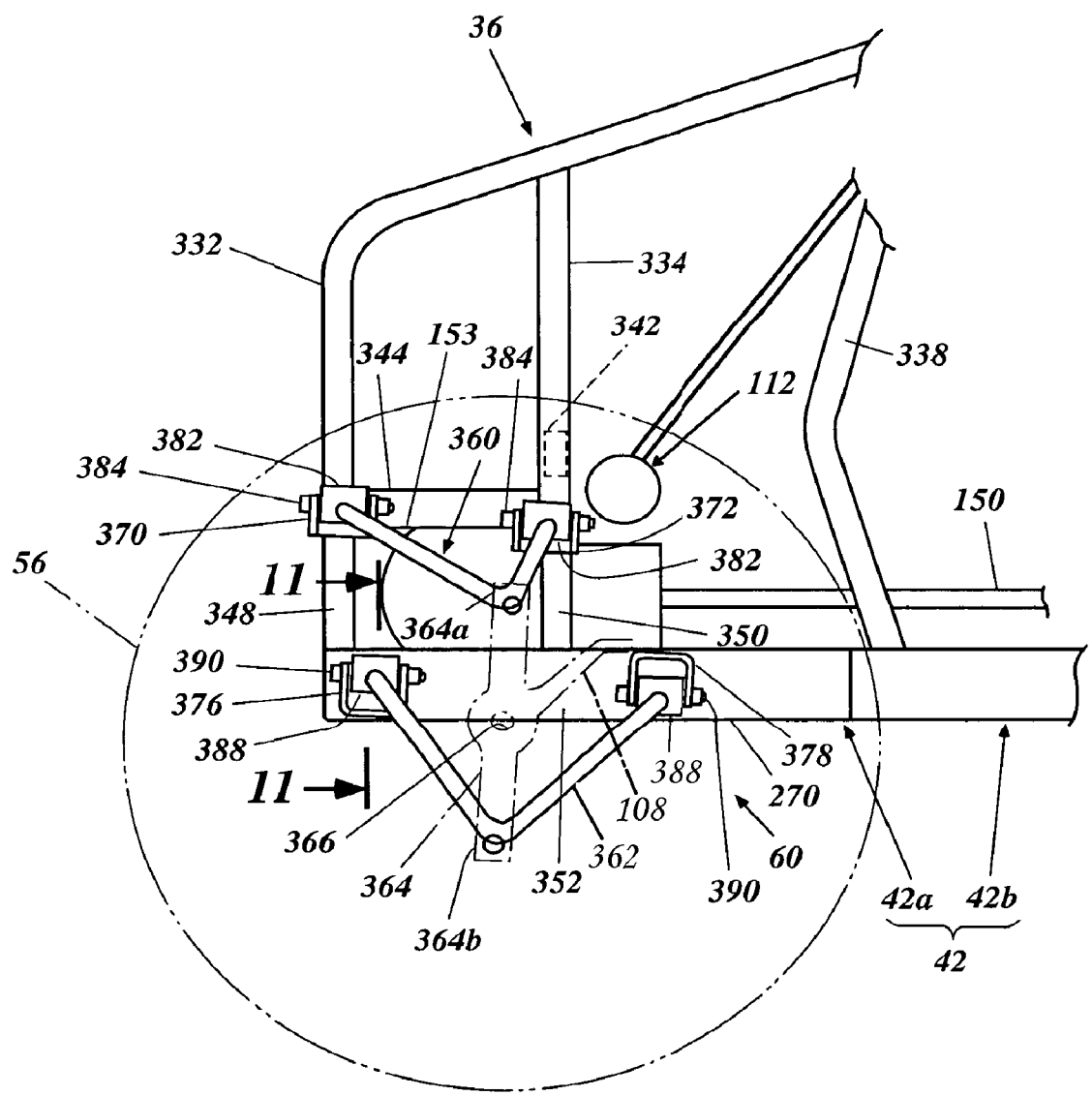
FIG. 10 is an enlarged partial left side elevational view of the frame in a front area of the off-road vehicle, wherein a portion of a front suspension mechanism also is shown.

With reference to FIG. 10, each suspension arm 360, 362 is configured generally as a V- or A-shape. The suspension arm 360 is disposed above the other suspension arm 362 and the link 364 (shown in phantom) connects the arms 360, 362 to each other to form generally a parallelogram linkage, as described above. The link 364 has an aperture 366 at a center portion thereof.

The axle of the front wheel 56 is journaled in the aperture 366. A top portion 364a of the link 364 is coupled with the upper suspension arm 360, while a bottom end portion 364b of the link 364 is coupled with the lower suspension arm 362. The damper is disposed between the upper suspension arm 360 and the main frame 34 to dampen shocks that occur while the off-road vehicle 30 proceeds over rugged terrain.

First and second brackets 370, 372, which together form a bracket unit, are affixed onto the side surfaces 348, 350 of the support members 332, 334, respectively, on each side of the frame. The first and second brackets 370, 372 form a set of retainers that retains the upper suspension arm 360. The first and second brackets 370, 372 preferably each have a generally U-shape. Each bottom surface of the U-shape preferably welded to each side surface 348, 350 of the support members 332, 334. Other connection methods and/or devices (e.g., fasteners) can be used to connect the brackets 370, 372 to the support members 332, 334.

Preferably, both the brackets 370, 372 are disposed close to the reinforcement member 344. Additionally, the first bracket 370 preferably is positioned slightly higher than the second bracket 372. Also, both the brackets 370, 372 preferably are slightly inclined such that each bottom is disposed farther forward than the respective top. In one variation, the first and second brackets 370, 372 can be unitarily formed so as to be a single bracket and can be affixed to the reinforcement member 344 in the slightly inclined position.

Third and fourth brackets 376, 378, which also together form a bracket unit, are affixed onto a vertical side surface 352 of the respective front member 42a on each side of the frame. The third and fourth brackets 376, 378 form a set of retainers that retains the lower suspension arm 362. The vertical side surface 352 extends generally vertically and is positioned outside of the front tubular member 42a, i.e., opposite to the longitudinal center plane LC. The third bracket 376 is disposed generally under and slightly rearward from the first bracket 376. The fourth bracket 378 is spaced apart rearward from the third bracket 376. A distance between the third and fourth brackets 376, 378 preferably is greater than a distance between the first and second brackets 370, 372.

The third and fourth brackets 376, 378 can each have a U-shape. One end of the side surfaces of the U-shape of the third bracket 376 is welded to a vertical surface of the front member 42a and is orientated so as to open upwardly (i.e., a lower wall section of the U-shape extends across the lower side of the third bracket 376). Other connection methods and/or devices can also be used.

One end of the side surfaces of the fourth bracket 378 is welded to the front member 42a and is oriented so as to open downwardly (i.e., an upper wall section of the U-shape extends across the upper side of the fourth bracket 376). Other connection methods and/or devices can also be used. Additionally, both the third and fourth brackets 376, 378 are inclined such that the bottom of each is slightly forward of the respective top end. Like the first and second brackets 370, 372, in one variation, the third and fourth brackets 370, 372 can be unitarily formed so as to be a single bracket and can be affixed to the front tubular member 42*a* in the slightly inclined position.

The upper suspension arm 360 is connected to the first and second brackets 370, 372. The lower suspension arm 362 is connected to the third and fourth brackets 376, 378. Respective arm portions of the lower suspension arm 362 preferably are longer than respective arm portions of the upper suspension arm 360.

Each distal end of the upper suspension arm 360 has a mount member 382. The mount member 382 on each end of the upper suspension arm 360 is interposed between the side surfaces of the first and second brackets 370, 372. A pin 384 extends through the side surfaces of the brackets 370, 372 and the mount member 382 to support and journal the suspension arm 360 for pivotal movement. The pin 384 for the first bracket 370 is positioned slightly higher than the pin 384 for the second bracket 3-72 because the first bracket 370 preferably is positioned slightly higher than the second bracket 372, as noted above.

Each distal end of the lower suspension arm 362 includes a mount member 388. The mount member 388 on each end is interposed between the side surfaces of the third and fourth brackets 376, 378. A pin 390 extends through the side surfaces of the brackets 376, 378 and the mount member 388 to support and journal the suspension arm 362 for pivotal movement. The pin 390 for the third bracket 376 is positioned slightly higher than the pin 390 for the fourth bracket 378 because, as noted above, the third bracket 376 opens upwardly and the fourth bracket 378 is opened downwardly.

The axes of the pins 384, 390 are slightly inclined upwardly and forwardly. The axes of the pins 384, 390 also extend generally parallel to each other. Further, the bottom end portion 364*a* of the link 364 is positioned slightly further forward than the aperture 366 of the link 364. Additionally, the aperture 366 is positioned slightly forward of the top end portion of the link 364.

As thus constructed in the illustrated embodiment, the front wheels 56 can swing up and down relative to the frame 32 and independently with each other while the off-road vehicle 30 proceeds over rugged terrain.

The inclination of the axes of the pins 384, 390, which places the bottom end portion 364*b* of the link 364 forward of the tope end portion 364*a* thereof, is advantageous because the off-road vehicle 30 can provide enhanced stability when the front wheels 56 run over obstacles. Further, the individual brackets 370, 372, 376, 378 can be positioned at any level (i.e., elevation). The illustrated front suspension mounting construction thus can provide various swing angles of the front suspensions without changing the major or fundamental framework of the off-road vehicle 30.

The flat vertical side surface 352 of the front tubular member 42*a* is advantageous to fix the brackets 376, 378 thereto. In addition, because the front tubular member 42*a* has such a simple rectangular parallelepiped shape, the production cost of the tubular member 42*a* can be relatively small and the front tubular member 42*a* can rigidly support the brackets 376, 378. In some alternatives, however, the front tubular member 42*a* can have any configurations, although the brackets 376, 378 preferably will have corresponding configurations that suit the configurations of the front tubular member 42*a*.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present suspension system has been described in the context of particularly preferred embodiments, the skilled artisan will appreciate, in view of the present disclosure, that certain advantages, features and aspects of the suspension system may be realized in a variety of other applications, many of which have been noted above. Additionally, it is contemplated that various aspects and features of the invention described can be practiced separately, combined together, or substituted for one another, and that a variety of combination and sub-combinations of the features and aspects can be made and still fall within the scope of the invention. Thus, it is intended that the scope of the present invention herein disclosed should not be limited by the particular disclosed embodiments described above, but should be determined only by a fair reading of the claims that follow.

What is claimed is:

1. An off-road vehicle comprising a frame, at least one wheel, and first and second suspension arms each including a plurality of ends and being configured to suspend the wheel from the frame, the frame including two frame members extending generally fore to aft, the vehicle further comprising front and rear sets of retainers being coupled to the frame members, the front set of retainers comprising a first upper retainer and a second lower retainer, the rear set of retainers comprising a third upper retainer and a fourth lower retainer, the rear set of retainers being disposed forwardly relative to a steering shaft of the vehicle, the first and third retainers retaining a first upper suspension arm so as to permit the first upper suspension arm to swing relative to the frame, the second and fourth retainers retaining a second lower suspension arm so as to permit the second lower suspension arm to swing relative to the frame, the third upper retainer being spaced from the fourth lower retainer at a spacing in the fore-to-aft direction, the spacing being larger than any fore-to-aft spacing between the first upper and second lower retainers.

2. The off road vehicle as set forth in claim 1, wherein the retainers extend generally vertically relative to the frame members.

3. The off road vehicle as set forth in claim 1 wherein the second suspension arm is spaced apart from the first suspension arm generally in the vertical direction, the vehicle additionally comprising a link coupling the first and second suspension arms with each other, the link being coupled to the wheel.

4. The off-road vehicle as set forth in claim 3, wherein the tops of the retainers are inclined outward relative to a longitudinal center plane of the frame, which extends generally vertically and fore to aft.

5. The off-road vehicle as set forth in claim 4, wherein the first suspension arm is disposed above the second suspension arm, and the second suspension arm is longer than the first suspension arm.

6. The off-road vehicle as set forth in claim 1, wherein each end of the respective suspension arms comprises a mount member, each one of the retainers has first and second surfaces opposing each other, and each one of the mount members is journaled between the first and second surfaces of one of the retainers.

7. The off-road vehicle as set forth in claim 6, wherein the first and second surfaces extend generally vertically.

8. The off-road vehicle as set forth in claim 7, wherein the first and second surfaces extend outward from the respective frame member relative to a longitudinal center plane of the frame, which extends generally vertically and fore to aft.

9. The off-road vehicle as set forth in claim 6, wherein the first and second surfaces extend outward from the respective frame member relative to a longitudinal center plane of the frame, which extends generally vertically and fore to aft.

10. The off-road vehicle as set forth in claim 9, wherein each one end of the first and second surfaces is connected to the respective frame member.

11. The off-road vehicle as set forth in claim 6, wherein the mount members are positioned at different elevations relative to each other.

12. The off-road vehicle as set forth in claim 11, wherein the mount member of a respective suspension arm, which is disposed more forward than the other mount member of the respective suspension arm, is positioned higher than the other mount member.

13. The off-road vehicle as set forth in claim 1, wherein the respective ones of the retainers are connected to the respective frame member.

14. The off-road vehicle as set forth in claim 13, wherein at least one of the two frame members has a vertical surface extending generally vertically, and the respective retainers are at least partially connected to the vertical surface.

15. The off-road vehicle as set forth in claim 14, wherein the at least one of the two frame members is a rectangular parallelepiped member.

16. The off-road vehicle as set forth in claim 1 wherein the frame additionally comprises a set of support members and the vehicle further comprises a link, the support members extending generally vertically, the support members spaced apart from each other fore to aft, and wherein at least one of the retainers is placed on one of the support members and at least another of the retainers is placed on another one of the support members, the link coupling together the first and second suspension arms, the link being coupled to the wheel.

17. The off-road vehicle as set forth in claim 1, wherein the fore-to-aft spacing between the first upper and the second lower retainers is greater than zero.

18. The off-road vehicle as set forth in claim 1, wherein the first upper retainer is spaced from the second lower retainer in the fore-to-aft direction.

19. The off-road vehicle as set forth in claim 1, wherein in a side elevational view of the vehicle, the rear set of retainers is disposed adjacent to a front end of the steering shaft.

20. The off-road vehicle as set forth in claim 1, wherein the steering shaft is coupled to a rack-and-pinion assembly in a position disposed rearwardly relative to an axis of the wheel.

21. The off-road vehicle as set forth in claim 1, wherein in a side elevational view of the vehicle, a front end of the steering shaft extends toward the rear set of retainers.

22. The off-road vehicle as set forth in claim 1, wherein the first upper retainer and the second lower retainer are disposed forward from a front end of the steering shaft.

23. The off-road vehicle as set forth in claim 1, wherein the third upper retainer is disposed forward from a front end of the steering shaft and the fourth lower retainer is disposed rearward from the front end of the steering shaft.

24. An off-road vehicle comprising a frame, at least one wheel rotatable about an axis, a first upper suspension arm configured to suspend the wheel from the frame, the first upper suspension arm having first and second ends connected to the frame, a second lower suspension arm configured to suspend the wheel from the frame, the second lower suspension arm having third and forth ends connected to the frame, the frame including at least first and second vertical members extending generally vertically, the first vertical member supporting the first end of the first upper suspension arm and the third end of the second lower suspension arm such that at least a portion of each of the first end and the third end overlaps the first vertical member as seen in side view, the second vertical member being disposed on a generally opposite side of said first suspension arm from said first end, the second vertical member supporting the second end of the first upper suspension arm and the fourth end of the second lower suspension arm such that at least a portion of each of the second end and the fourth end overlaps the second vertical member as seen in side view, the vertical members spaced apart from each other fore to aft and arranged on opposite sides of the axis of the wheel, the first upper suspension arm being coupled to the vertical members in a manner permitting the suspension arm to swing relative to the frame and at least the third end of the second suspension member being coupled to at least the first vertical member in a manner permitting the suspension arm to swing relative to the frame.

25. The off-road vehicle as set forth in claim 24, wherein the frame additionally includes first and second horizontal members extending generally horizontally fore to aft to support the vertical members.

26. The off-road vehicle as set forth in claim 24, wherein the second suspension arm is spaced vertically apart from the first upper suspension arm, the second suspension arm also being coupled to the vertical members, and a link coupling the first and second suspension arms together, the link supporting the wheel.

27. The off-road vehicle as set forth in claim 26, wherein the vertical members are inclined outward and upward relative to a longitudinal center plane of the frame, that extends generally vertically and fore to aft.

28. The off-road vehicle as set forth in claim 27, wherein the first upper suspension arm is disposed above the second suspension arm, and the second suspension arm is longer than the first suspension arm.

29. The off-road vehicle as set forth in claim 24 additionally comprising a rear differential coupled to the wheel, one of the first and second vertical members being disposed generally forward of the rear differential and the other one of the first and second vertical members being disposed generally rearward of the rear differential.

30. The off-road vehicle as set forth in claim 24, wherein at least a portion of a rear differential is located above at least a portion of the first upper suspension arm.

31. The off-road vehicle as set forth in claim 24, wherein the first end of the first upper suspension arm and the third end of the second lower suspension arm are coupled to the first vertical member via a first set of retainers.

32. The off-road vehicle as set forth in claim 24, wherein the second end of the first upper suspension arm and the fourth end of the second lower suspension arm are coupled to the second vertical member via a second set of retainers.

33. An off-road vehicle comprising a frame, at least one wheel, and first and second suspension arms being configured to suspend the wheel from the frame, the frame including two horizontal members extending generally horizontally fore to aft, each end of the first and second suspension arms comprising a mount member, each mount member defining a pivot axis, the vehicle further comprising first and second sets of retainers being coupled to the horizontal members, each of the retainers of the first set being configured to retain the mount members of the first suspension arm with the pivot axes thereof being oriented parallel and noncoaxial with respect to each other, the retainers of the second set each being configured to retain the mount members of the second suspension arm with the pivot axes thereof being oriented parallel and noncoaxial with respect to each other, the first and second suspension arms being pivotable relative to the respective ones of the first and second sets of retainers.

34. The off-road vehicle as set forth in claim 33, wherein each of the first and second sets of retainers comprises a set of brackets spaced apart from each other fore to aft and each one of the brackets journals a respective one of the mount members for pivotal movement.

35. The off-road vehicle as set forth in claim 34, wherein the mount members of at least one of the first and second sets are positioned at different elevations relative to each other.

36. The off-road vehicle as set forth in claim 35, wherein an upper portion of one of the brackets journals one of the mount members, a lower portion of the other bracket journals the other mount member.

37. The off-road vehicle as set forth in claim 35, wherein the mount member of a respective suspension arm, which is disposed more forward than the other mount member of the respective suspension arm, is positioned higher than the other mount member.

38. The off road vehicle as set forth in claim 34, wherein each one of the brackets has first and second surfaces opposing each other, and each one of the mount members is journaled between the first and second surfaces of the respective bracket.

39. The off-road vehicle as set forth in claim 38, wherein each one end of the first and second surfaces is connected to a respective vertical surface of a respective horizontal member.

40. The off road vehicle as set forth in claim 37, wherein the suspension arm has a link to suspend an axle of the wheel, the link has a first portion coupled with the suspension arm and a second portion coupled with the axle of the wheel, and the first portion is positioned forward of the second portion.

41. The off road vehicle as set forth in claim 37 wherein the suspension arm has a link to suspend an axle of the wheel, the link coupling together the first and second suspension arms, the link being coupled to the wheel.

42. The off road vehicle as set forth in claim 33 additionally comprising a prime mover supported by the frame to power the wheel, and the retainers are positioned on the frame at a location forward of the prime mover.

43. An off road vehicle comprising a frame, first and second suspension arms, and first and second sets of retainers, the frame extending generally horizontally fore to aft, the first and second suspension arms each including a plurality of ends and being configured to suspend a wheel from the frame, the first and second sets of retainers being coupled to the frame, the retainers of the first set being spaced apart from each other fore to aft at a first distance, the retainers of the second set being spaced apart from each other fore to aft at a second distance, the first and second distances being unequal, a front retainer of each set being configured to retain a front end of a respective suspension arm and a rear retainer of each set being configured to retain a rear end of a respective suspension arm in a manner permitting the respective suspension arm to swing relative to the respective set of retainers, the front retainers being spaced apart from each other in a fore to aft direction by a distance which is smaller than a distance by which the rear retainers are spaced apart from each other in a fore to aft direction, the rear retainers being disposed forwardly relative to a steering shaft of the vehicle.

44. An off-road vehicle comprising a frame, first and second suspension arms, and first and second sets of retainers, the frame extending generally horizontally fore to aft, the first and second suspension arms each including a plurality of ends and being configured to suspend a wheel from the frame, each end of the first and second suspension arms comprising a mount member, each mount member defining a pivot axis, the first and second sets of retainers being coupled to the frame, each of the retainers of the first set being configured to retain the mount members of the first suspension arm with the pivot axes thereof being oriented parallel and noncoaxial with respect to each other, the retainers of the second set each being configured to retain the mount members of the second suspension arm with the pivot axes thereof being oriented parallel and noncoaxial with respect to each other, the first and second suspension arms being pivotable relative to the respective ones of the first and second sets of retainers.

45. An off-road vehicle comprising a frame and upper and lower suspension arms, the frame extending generally horizontally fore to aft, the upper and lower suspension arms each including two ends being pivotally coupled to the frame, the ends of upper suspension arm being spaced apart from each other fore to aft at a first length, the ends of lower suspension arm being spaced apart from each other fore to aft at a second length, wherein a midpoint of the first length is not aligned with a midpoint of the second length along a vertical line, wherein rear ends of the upper and lower suspension arms are disposed forwardly relative to a steering shaft of the vehicle.

46. An off-road vehicle comprising a frame, at least one wheel, and first and second suspension arms each including a plurality of ends and being configured to suspend the wheel from the frame, the frame including two frame members extending generally fore to aft, the vehicle further comprising at least a first forward-most upper retainer, a first rearward-most upper retainer, a second forward-most lower retainer, and a second rearward-most lower retainer, the first forward-most and rearward-most upper retainers pivotally connecting the first suspension arm to the frame, the second forward-most and rearward-most lower retainers connecting the second suspension arm to the frame, wherein the first forward-most upper retainer is disposed forwardly relative to the second forward-most lower retainer and the first rearward-most upper retainer is disposed forwardly relative to the second rearward-most lower retainer, the first rearward-most upper retainer and second rearward-most lower retainer being disposed forwardly relative to a steering shaft of the vehicle.

* * * * *

UNITED STATES PATENT AND TRADEMARK OFFICE
CERTIFICATE OF CORRECTION

PATENT NO. : 7,510,199 B2  
APPLICATION NO. : 10/796692  
DATED : March 31, 2009  
INVENTOR(S) : Nash et al.

It is certified that error appears in the above-identified patent and that said Letters Patent is hereby corrected as shown below:

At column 2, line 62, please change "VEHICLE,"a" to --VEHICLE," a--.

At column 2, line 64, please change "VEHICLE" to --VEHICLE,"--.

At column 3, line 2, please change "VEHICLE,"a" to --VEHICLE," a--.

At column 3, line 4, please change "VEHICLE,"a" to --VEHICLE," a--.

At column 3, lines 6-7, please change "SYSTEM,"and" to --SYSTEM," and--.

At column 3, line 9, please change "VEHICLE,"the" to --VEHICLE," the--.

At column 4, line 51, please change "Also" to --Also,--.

At column 15, line 34, please change "portion's" to --portions--.

At column 19, line 25, please change "3-72" to --372--.

At column 20, line 45, in Claim 2, please change "off road" to --off-road--.

At column 20, line 48, in Claim 3, please change "off road" to --off-road--.

At column 22, line 10, in Claim 24, please change "first" to --first upper--.

At column 23, line 25, in Claim 38, please change "off road" to --off-road--.

At column 23, line 34, in Claim 40, please change "off road" to --off-road--.

At column 23, line 39, in Claim 41, please change "off road" to --off-road--.

At column 23, line 43, in Claim 42, please change "off road" to --off-road--.

At column 23, line 47, in Claim 43, please change "off road" to --off-road--.

Signed and Sealed this

Twenty-fifth Day of August, 2009

David J. Kappos  
*Director of the United States Patent and Trademark Office*